United States Patent
Park et al.

(10) Patent No.: US 8,189,508 B2
(45) Date of Patent: May 29, 2012

(54) METHODS AND APPARATUS FOR PEER DISCOVERY ASSIST

(75) Inventors: Vincent D. Park, Budd Lake, NJ (US); Thomas Richardson, South Orange, NJ (US); Junyi Li, Bedminster, NJ (US); Sanjay Shakkottai, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 931 days.

(21) Appl. No.: 12/163,216

(22) Filed: Jun. 27, 2008

(65) Prior Publication Data

US 2009/0323647 A1  Dec. 31, 2009

(51) Int. Cl.
*H04W 4/00* (2009.01)
(52) U.S. Cl. ........................................ 370/328
(58) Field of Classification Search .................. 370/311, 370/312, 338
See application file for complete search history.

(56) References Cited

U.S. PATENT DOCUMENTS

| | | | | |
|---|---|---|---|---|
| 6,272,190 | B1* | 8/2001 | Campana, Jr. ................. | 375/347 |
| 7,676,541 | B2* | 3/2010 | Olson et al. .................... | 709/204 |
| 7,743,408 | B2* | 6/2010 | Aboba et al. ..................... | 726/4 |
| 2002/0152299 | A1* | 10/2002 | Traversat et al. ............. | 709/223 |
| 2003/0189977 | A1* | 10/2003 | Sweitzer et al. .............. | 375/222 |
| 2006/0222913 | A1* | 10/2006 | Suzuki ............................. | 429/22 |
| 2007/0149194 | A1* | 6/2007 | Das et al. ....................... | 455/436 |
| 2007/0286136 | A1* | 12/2007 | Rittle et al. .................... | 370/338 |
| 2008/0112334 | A1* | 5/2008 | Laroia et al. ................... | 370/254 |
| 2008/0123577 | A1* | 5/2008 | Jaakkola et al. .............. | 370/311 |
| 2008/0244139 | A1* | 10/2008 | Nakajima ...................... | 710/300 |
| 2008/0250294 | A1* | 10/2008 | Ngo et al. ...................... | 714/752 |
| 2008/0307478 | A1* | 12/2008 | Kim et al. ...................... | 725/114 |
| 2008/0313450 | A1* | 12/2008 | Rosenberg ....................... | 713/2 |
| 2009/0046682 | A1* | 2/2009 | Kim et al. ...................... | 370/338 |
| 2009/0287827 | A1* | 11/2009 | Horn et al. ..................... | 709/227 |
| 2010/0014458 | A1* | 1/2010 | Singh et al. ................... | 370/328 |

(Continued)

FOREIGN PATENT DOCUMENTS

EP  1489779  12/2004

(Continued)

OTHER PUBLICATIONS

"International Search Report and Written Opinion—PCT/US2009/048919, International Search Authority—European Patent Office—Oct. 22, 2009."

*Primary Examiner* — Chi Pham
*Assistant Examiner* — Farah Faroul
(74) *Attorney, Agent, or Firm* — Peng Zhu; James K. O'Hare

(57) ABSTRACT

Methods and apparatus related to peer, network or service discovery in a mobile wireless system, such as an ad hoc peer-to-peer network, are described. Transmission of discovery information, such as upper layer discovery information, is divided into a number of portions to be transmitted separately over time. Transmission of the individual portions is structured to enable flexibility in the frequency of the peer discovery transmissions as well as the monitoring of such transmissions. Various embodiments facilitate rapid discovery and secure discovery, such as selective discovery by trusted peers. The structuring enables proxying of some transmissions by a third party, such as an assist node. The assist node receives discovery information portions being communicated at a first rate and retransmits the received discovery information portions at a second rate which is higher than the first rate.

34 Claims, 16 Drawing Sheets

U.S. PATENT DOCUMENTS

| | | | |
|---|---|---|---|
| 2010/0272081 A1* | 10/2010 | Laroia et al. | 370/338 |
| 2010/0315954 A1* | 12/2010 | Singh et al. | 370/241 |
| 2011/0028093 A1* | 2/2011 | Patel et al. | 455/41.2 |
| 2011/0087768 A1* | 4/2011 | Wu et al. | 709/224 |
| 2011/0119483 A1* | 5/2011 | Fleming et al. | 713/150 |
| 2011/0199918 A1* | 8/2011 | Sampath et al. | 370/252 |
| 2011/0275089 A1* | 11/2011 | Bogunovic et al. | 435/6.14 |
| 2012/0011247 A1* | 1/2012 | Mallik et al. | 709/224 |

FOREIGN PATENT DOCUMENTS

| | | |
|---|---|---|
| EP | 1865687 | 12/2007 |
| WO | WO9619887 | 6/1996 |
| WO | WO2008056916 A1 | 5/2008 |

\* cited by examiner

METHODS AND APPARATUS FOR PEER DISCOVERY ASSIST

FIELD

Various embodiments relate to wireless communications, and more particularly, to methods and apparatus related to the communication of peer discovery information.

BACKGROUND

In a wireless network, e.g., an ad hoc peer to peer wireless network, it can be beneficial for a wireless communications device, e.g., a mobile node, to support the ability to transmit, e.g., broadcast, various types of discovery information, e.g., peer discovery information, network discovery information and/or service discovery information. The broadcasting of such information can be used by other peer devices currently in its local vicinity to form a situational awareness. This exchange of wireless device broadcast discovery information among peers can be particularly useful in a network lacking centralized coordination and/or control. Different wireless communications devices may have different capabilities and/or needs with regard to the transmission and/or reception of discovery information. In addition, an individual wireless communications device may, at different times, have different capabilities and/or needs with regard to the transmission and/or reception of discovery information. Broadcasting discovery information may be considered overhead signaling, and resources such as power expended for discovery information signaling transmissions may be unavailable for traffic signaling. The power expended by a mobile wireless communications device for transmitting discovery information and the reserve battery power remaining are important considerations in implementing a structure supporting the communication of discovery information. The transmitting of discovery information at a high rate has the benefit of reducing discovery latency, yet comes at a cost of expending more power, e.g., reducing battery lifetime.

Based on the above discussion it should be appreciated there is a need for novel methods and apparatus that support rapid communication of discovery information, yet do not overly tax the limited power resources of battery operated mobile devices.

SUMMARY

Various embodiments relate to wireless communications systems which enables direct wireless communications between subscriber devices, e.g., ad hoc peer to peer networks including mobile devices. In accordance with a feature of some embodiments, a process known as peer discovery enables autonomous detection of peers, networks, and/or services that are of interest to a particular subscriber device. In some instances, the implemented peer discovery mechanisms support multiple rates of sending and/or monitoring peer discovery information. Thus at a given location and time, some subscriber devices may be performing peer discovery at a first rate, e.g., a low rate, while other devices may be performing peer discovery at a second rate, e.g., a high rate. In general performing peer discovery operations at a higher rate has the benefit of reducing latency at the cost of utilizing more communication resources and expending more power, e.g., reducing battery lifetime.

To enable the benefits of high rate discovery, e.g., reduced discovery latency, without incurring the cost of expending more power on a battery powered device, e.g., reducing battery life of a mobile wireless device, a peer discovery assist capable node is utilized. The peer discovery assist node receives low rate peer discovery information from one or more other nodes and resends substantially equivalent information at a higher rate. In various embodiments, peer discovery information is structured so as to allow this behavior while still maintaining desired feature functionality, e.g., security. In some embodiments, a peer discovery assist node is a device with abundant power, e.g., having a hard wired power source. In some embodiments, a peer discovery assist node may, and sometimes does, assist operations for a plurality of other nodes. In some other instances, any node in the system can provide peer discovery assistance to any other node in the system, e.g., as determined by a variety of policy and performance constraints.

Methods and apparatus related to peer/network/service discovery in a mobile wireless system, e.g., an ad hoc peer-to-peer network are described. Transmission of discovery information, e.g., upper layer discovery information, is divided into a number of portions to be transmitted separately over time. Transmission of the individual portions is structured so as to enable flexibility in the frequency of the peer discovery transmissions as well as the monitoring of such transmissions.

Some air link resources, e.g., discovery information segments, are associated with low rate discovery signaling, while other air link resources are associated with high rate discovery information signaling. A signal communicated on an additional air link resource associated with high rate discovery signaling conveys a discovery information portion previously transmitted on a low rate discovery signal air link resource. Various embodiments facilitate rapid discovery and/or secure discovery, e.g., selective discovery by trusted peers.

The structuring enables proxying of some transmissions by a third party, e.g., a first node functioning to provide discovery assistance for other nodes. The first node is, e.g., an assist node, a server node such as a base station, or a wireless terminal such as a mobile node. For example, second device, e.g., a peer to peer wireless device in an ad hoc wireless network, which is currently operating in a low rate discovery transmit mode, is transmitting discovery information at a low rate using low rate discovery air link resources. A first node which is functioning to assist in discovery, located in the vicinity of the second node and which has decided to assist the second device, receives the low rate discovery signals from the second device and retransmits the received low rate discovery signals during additional high rate discovery intervals. Thus the first node discovery transmissions supplement the second node discovery transmissions. A third node, e.g., another peer to peer communications device in the vicinity, is able to receive low rate discovery signals from the second node and high rate discovery signals from the first node. Thus the third node is able to recover discovery information as if the second communications device had been in high rate discovery mode and had transmitted each of the discovery signals. In various embodiments, the proxying is performed by the first node without comprising the overall security of the discovery process.

An exemplary method of operating a first node, e.g., an assist node, a server node such as a base station, or a wireless terminal, to assist in communicating peer discovery information corresponding to a second node comprises: receiving over an airlink portions of one or more sets of peer discovery information from the second node, said portions being received at a first rate; and transmitting over an airlink at a second rate which is faster than said first rate, received portions of peer discovery information corresponding to said first node. An exemplary first node to assist in communicating peer discovery information corresponding to a second node comprises: a wireless receiver module for receiving over an airlink portions of one or more sets of peer discovery information from the second node, said portions being received at a first rate and a wireless transmitter module for transmitting over an airlink at a second rate which is faster than said first rate, received recovered portions of peer discovery information corresponding to said first node. In some embodiments, the first node further comprises one or more of: a peer discovery portion recovery module for recovering said received portions; a storage module for storing said recovered received portions. In various embodiments, the first node further comprises: an assist control module for controlling said wireless transmitter module to transmit said received recovered portion of peer discovery information corresponding to the second node at the second rate. In some embodiments, the first node supports discovery node assistance for multiple nodes operating in low rate discovery transmit mode.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
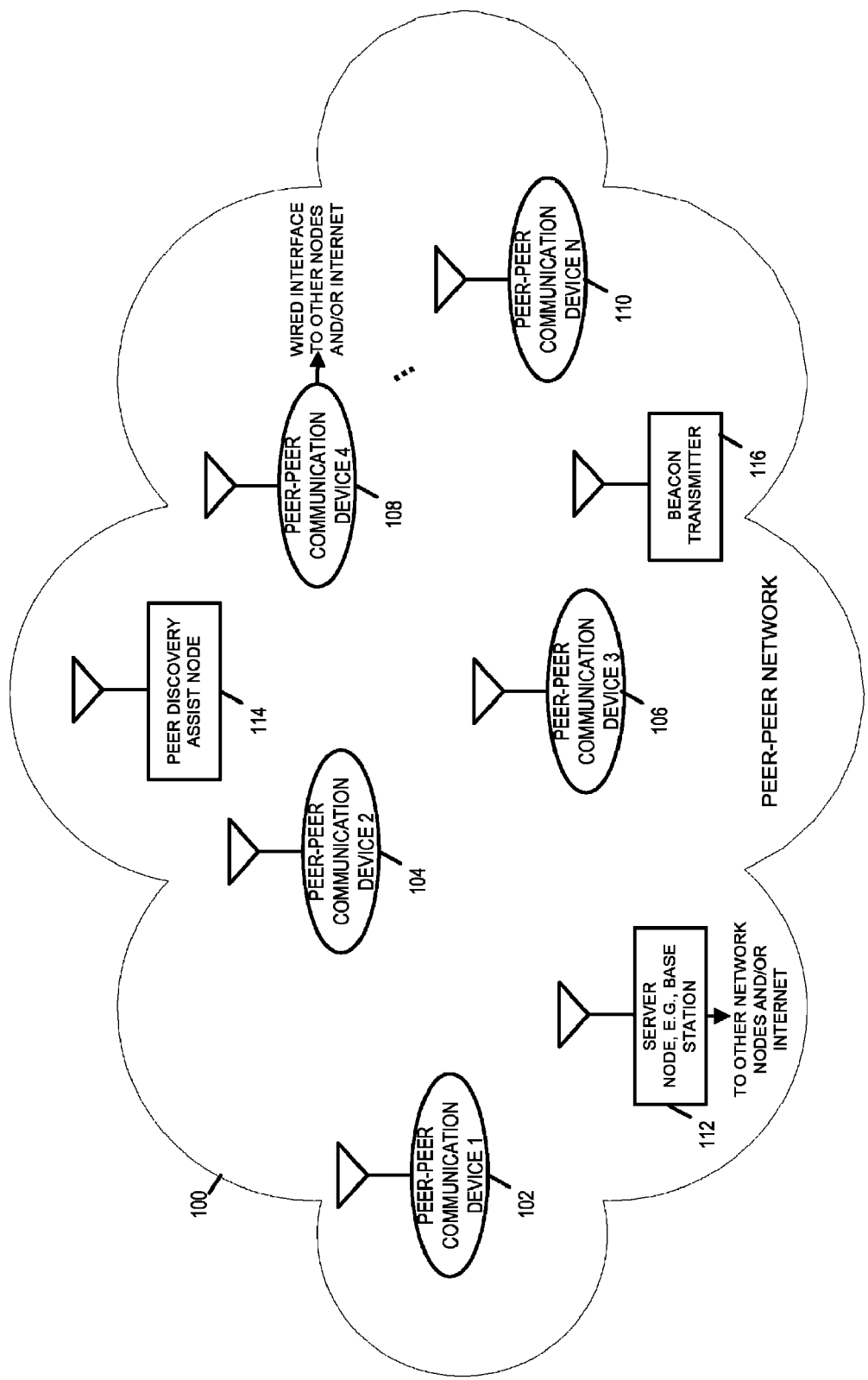
FIG. 1 is a drawing of an exemplary peer to peer network in accordance with an exemplary embodiment.

FIG. 1 is a drawing of an exemplary peer to peer network 100 in accordance with an exemplary embodiment. Peer to peer network 100 includes a plurality of wireless peer to peer communications devices (peer to peer communications device 1 102, peer to peer communications device 2 104, peer to peer communications device 3 106, peer to peer communications device 4 108, . . . , peer to peer communications device N 110). Some of the peer to peer communications devices, e.g., peer to peer communications device 4 108, also include a wired interface which couples the device to other nodes and/or the Internet. The peer to peer communications devices (102, 104, 106, 108, 110) store information defining a peer discovery transmission structure including transmission units to be used for low rate discovery transmissions and additional transmission units to be used for high rate discovery transmissions.

Peer to peer network 100 also includes a peer discovery assist node 114, a server node 112, e.g., a base station, and a beacon transmitter 116. Peer discovery assist node 114 can, and sometimes does, receives portions of one or more sets of peer discovery information from one or more peer to peer communications devices at a first rate and transmits the information over an airlink at a second rate which is faster than the first rate. Similarly, server node 112 can, and sometimes does, receives portions of one or more sets of peer discovery information from a peer to peer communications device at a first rate and transmits the information over an airlink at a second rate which is faster than the first rate. Server node 112 includes both a wireless interface and a wired interface. The wired interface of the server 112 couples the server to other network nodes and/or the Internet. Beacon transmitter 116 transmits a beacon signal, e.g., an OFDM beacon signal having a high power concentration on one or a few tones, which is easily detectable and intended to be utilized by the peer to peer devices in its vicinity to establish a timing reference with respect to the peer to peer timing structure being utilized in the region.

Figure 2:
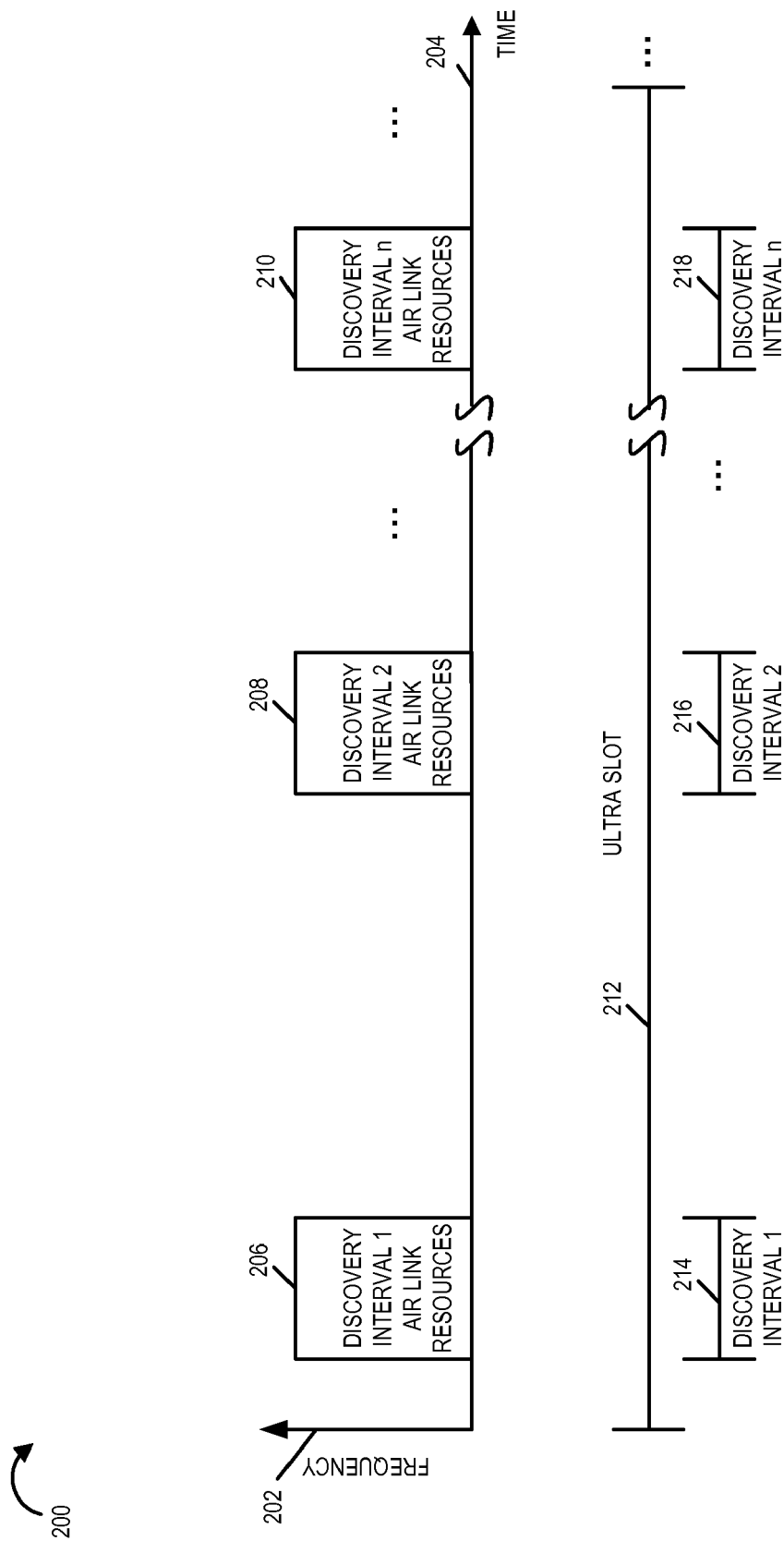
FIG. 2 illustrates discovery intervals and corresponding discovery interval air link resources within a recurring peer to peer timing structure in accordance with an exemplary embodiment.

FIG. 2 includes a drawing 200 illustrating discovery intervals (discovery interval 1 214, discovery interval 2 216, . . . , discovery interval n 218) within a recurring peer to peer timing structure including an ultra slot 212. In the recurring peer to peer timing structure the ultra slot repeats. Vertical axis 202 represents frequency, e.g., OFDM tones, while horizontal axis 204 represents time. Corresponding to each of discovery intervals (discovery interval 1 214, discovery interval 2 216, . . . , discovery interval n 218) there is a corresponding block of discovery interval air link resources (discovery interval 1 air link resources 206, discovery interval 2 air link resources 208, . . . discovery interval n air link resources 210). Each block of discovery interval air link resources, e.g., discovery interval 1 air link resources 206, is, e.g., a block of OFDM tone-symbols, where each OFDM tone-symbol represents one OFDM tone for the duration of one OFDM symbol transmission time interval.

Figure 3:
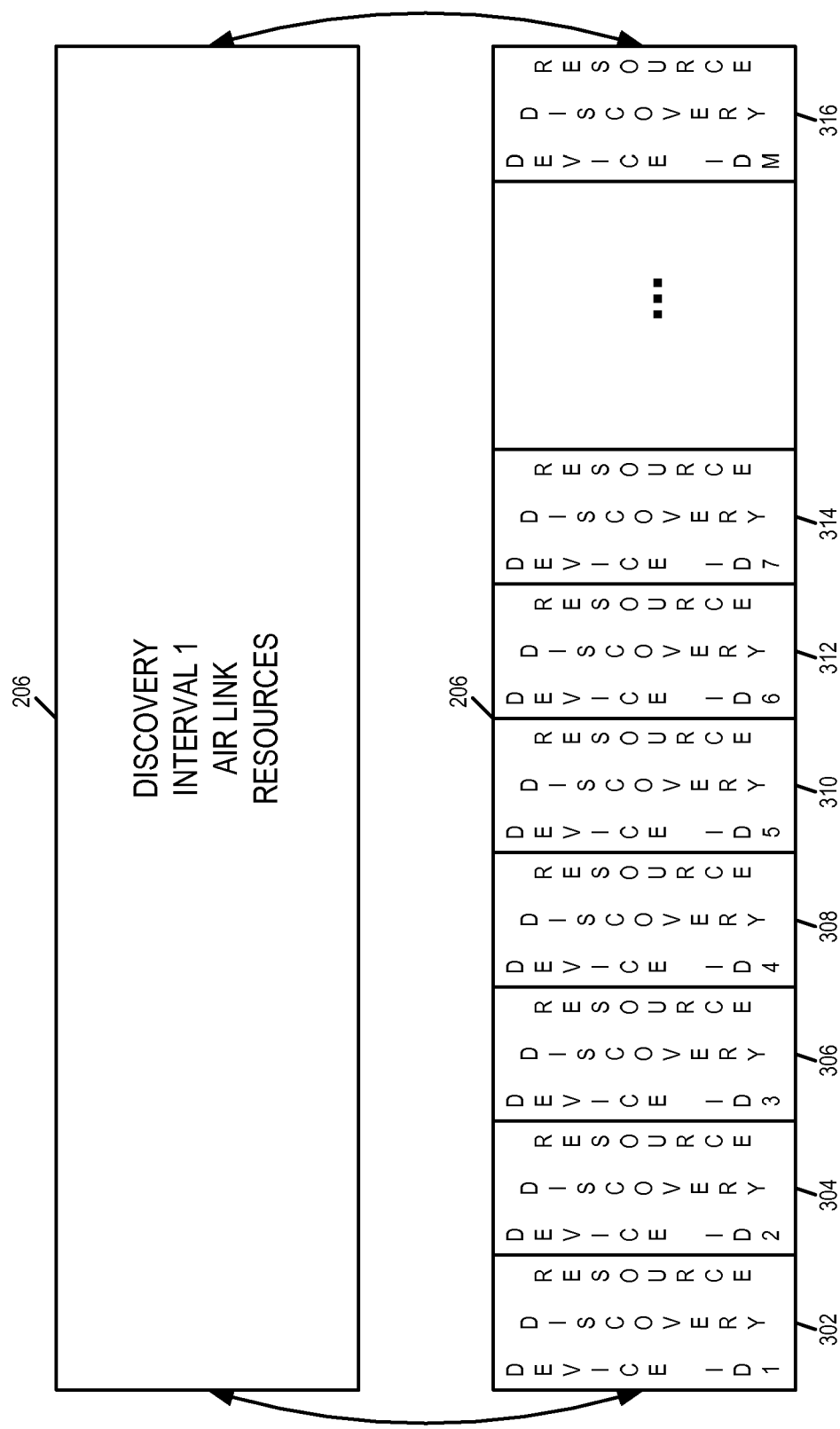
FIG. 3 illustrates a more detailed representation of a first exemplary discovery interval's air link resources.

FIG. 3 shows a more detailed representation of discovery interval 1 air link resources 206 in accordance with one exemplary embodiment. Discovery interval 1 air link resources 206 include a plurality of discovery air link resources corresponding to different device identifiers. Discovery interval 1 air link resources includes device ID 1 discovery resource 302, followed by device ID 2 discovery resource 304, followed by device ID 3 discovery resource 306, followed by device ID 4 discovery resource 308, followed by device ID 5 discovery resource 310, followed by device ID 6 discovery resource 312, followed by device ID 7 discovery resource 314, . . . , and device ID M discovery resource 316.

Figure 4:
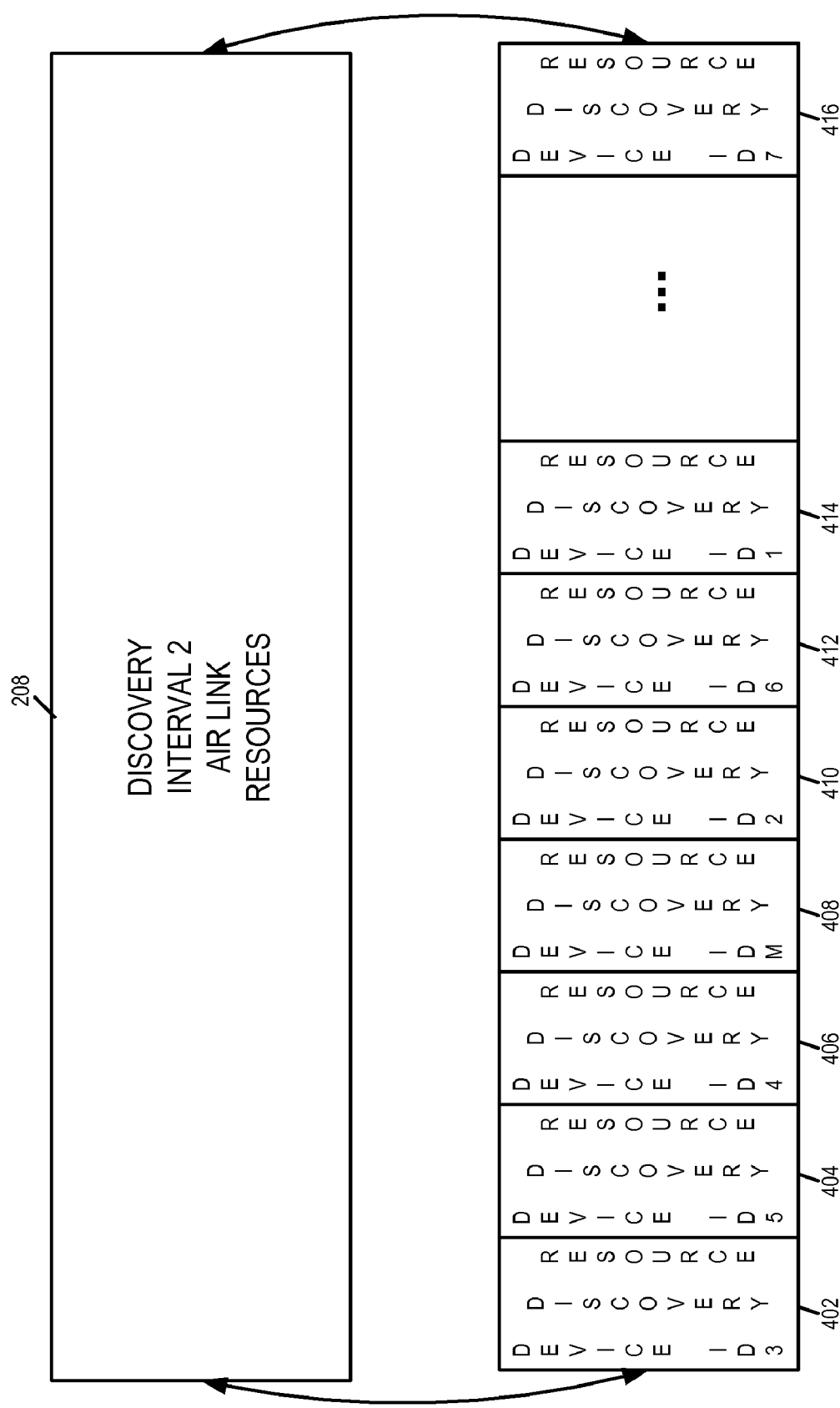
FIG. 4 illustrates a more detailed representation of a second exemplary discovery interval's air link resources.

FIG. 4 shows a more detailed representation of discovery interval 2 air link resources 208 in accordance with one exemplary embodiment. Discovery interval 2 air link resources 208 include a plurality of discovery air link resources corresponding to different device identifiers. Discovery interval 2 air link resources 208 includes device ID 3 discovery resource 402, followed by device ID 5 discovery resource 404, followed by device ID 4 discovery resource 406, followed by device ID M discovery resource 408, followed by device ID 2 discovery resource 410, followed by device ID 6 discovery resource 412, followed by device ID 1 discovery resource 414, . . . , and device ID 7 discovery resource 416. It may be observed that the order of the discovery resources associated with different device identifiers has changed from discovery interval 1 206 to discovery interval 2 208 in this exemplary embodiment. The ordered change in accordance with a predetermined hopping sequence employed in the peer to peer timing/frequency structure being utilized. In some other embodiments, the relative position of air link resources associated with a particular device identifier does not change from one interval to the next.

Figure 5:
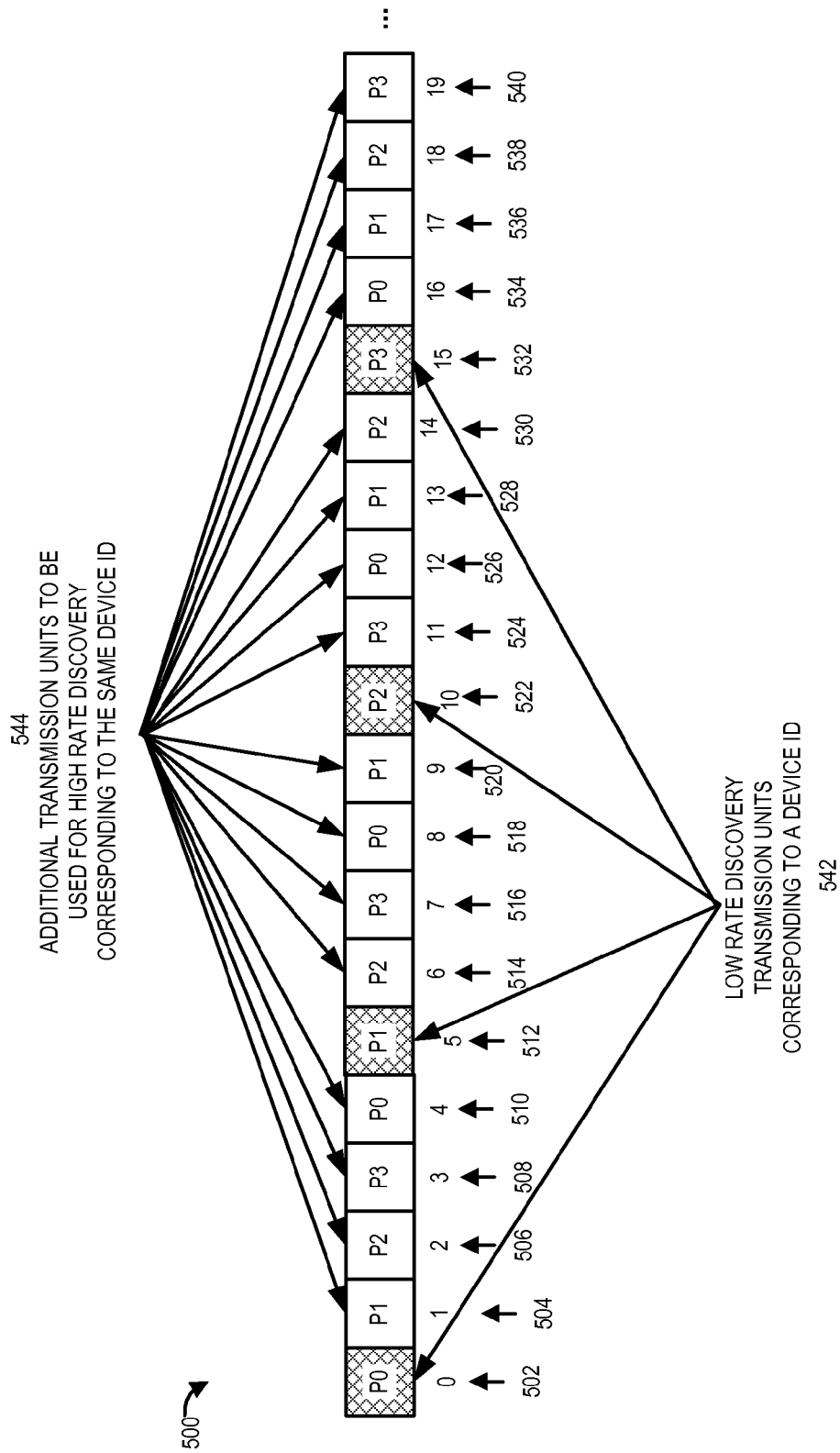
FIG. 5 illustrates a plurality of ordered transmission units available for transmitting discovery information corresponding to a device identifier which are part of a peer discovery transmission structure.

FIG. 5 is a drawing 500 illustrating a plurality of ordered transmission units available for transmitting discovery information which are part of a peer discovery transmission structure. The plurality of illustrated ordered transmission units include transmission unit 0 502, transmission unit 1 504, transmission unit 2 506, transmission unit 3 508, transmission unit 4 510, transmission unit 5 512, transmission unit 6 514, transmission unit 7 516, transmission unit 8 518, transmission unit 9 520, transmission unit 10 522, transmission unit 11 524, transmission unit 12 526, transmission unit 13 528, transmission unit 14 530, transmission unit 15 532, transmission unit 16 534, transmission unit 17 536, transmission unit 18 538 and transmission unit 19 540, which are part of a peer discovery transmission structure, and which are associated with a particular device identifier. For example, consider that the transmission units in drawing 500 of FIG. 5 belong to device ID 2. Continuing with the example, transmission unit 0 502 may be device ID 2 discovery resource 304 of discovery interval 1 air link resources 206 and transmission unit 1 504 may be device ID 2 discovery resource 410 of discovery interval 2 of air link resources 208, as illustrated in FIGS. 2, 3 and 4.

The plurality of ordered transmission units available for transmitting peer discovery information includes low rate discovery transmission units corresponding to a device identifier as indicated by grouping 542 and additional transmission units to be used for high rate discovery corresponding to the same device identifier as indicated by grouping 544. In this example, the set of low rate discovery transmission units corresponding to the device identifier 542 are illustrated with crosshatch shading and include transmission units 502, 512, 522 and 532. The set of additional transmission units to be used for high rate discovery corresponding to the device identifier are illustrated without shading and include transmission units 504, 506, 508, 510, 514, 516, 518, 520, 524, 526, 528, 530, 534, 536, 538 and 540.

Figure 6:
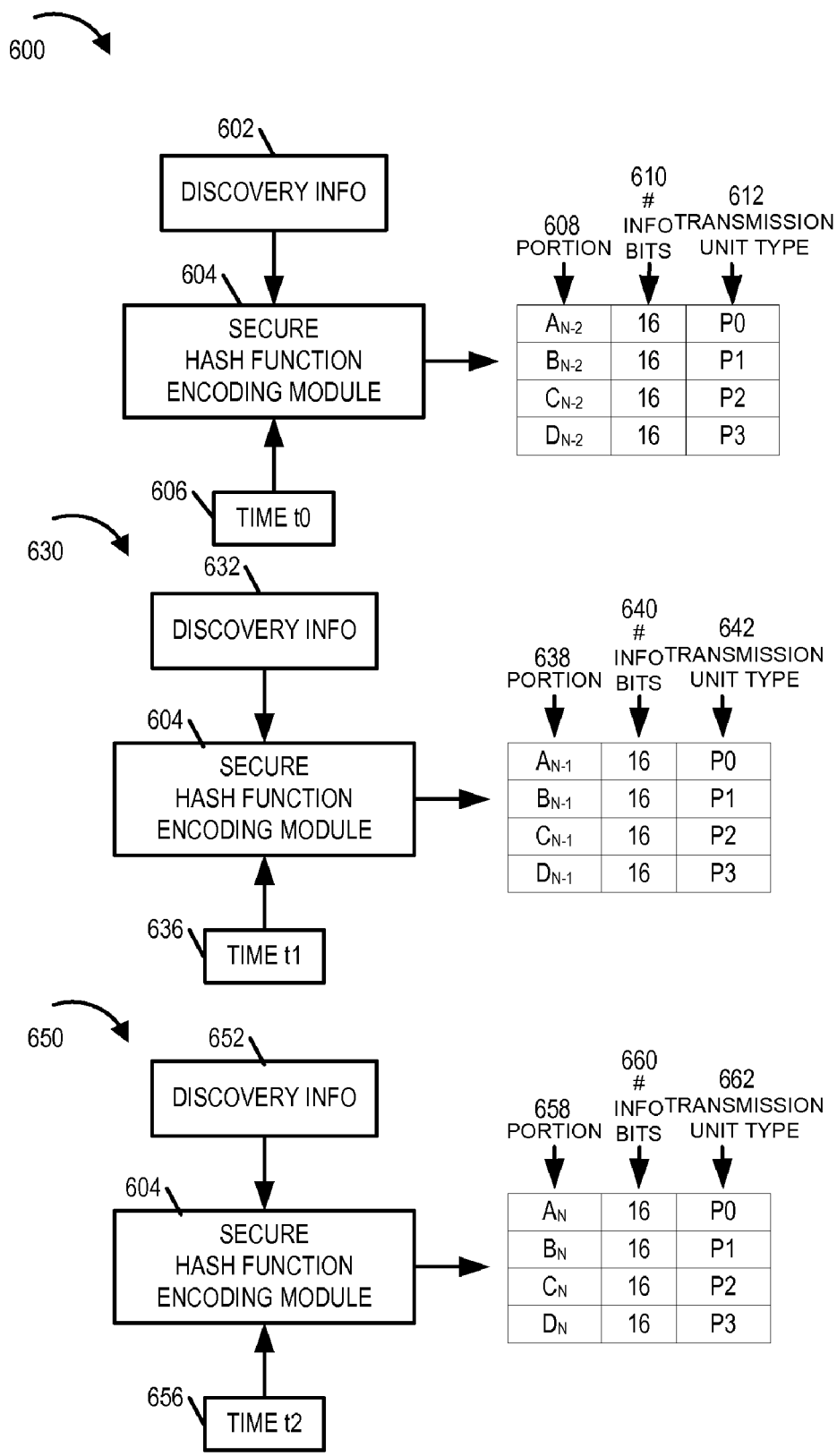
FIG. 6 illustrates a securing hash function encoding module processing input discovery information to generate encoded information.

FIG. 6 illustrates a securing hash function encoding module 604 processing input discovery information which generates encoded information. The output encoded information is mapped to portions, each portion being communicated via a transmission unit.

Drawing 600 illustrates that the secure hash function encoding module 604 receives discovery information 602 and time value t0 606 and generates a set of output information including a plurality of portions ($A_{N-2}$, $B_{N-2}$, $C_{N-2}$, $D_{N-2}$) as indicated by column 608. In this example, each portion corresponds to 16 information bits as indicated by column 610. Column 612 indicates that there is a correspondence between different encoded output portions and transmission unit types. More particularly, portion $A_{N-2}$ is to be communicated using a P0 transmission unit type in the recurring timing structure; portion $B_{N-2}$ is to be communicated using a P1 transmission unit type in the recurring timing structure; portion $C_{N-2}$, is to be communicated using a P2 transmission unit type in the recurring timing structure; and portion $D_{N-2}$, is to be communicated using a P3 transmission unit type in the recurring timing structure.

Drawing 630 illustrates that the secure hash function encoding module 604 receives discovery information 632 and time value t1 636 and generates a set of output information including a plurality of portions ($A_{N-1}$, $B_{N-1}$, $C_{N-1}$, $D_{N-1}$) as indicated by column 638. In this example, each portion corresponds to 16 information bits as indicated by column 640. Column 642 indicates that there is a correspondence between different encoded output portions and transmission unit types. More particularly, portion $A_{N-1}$ is to be communicated using a P0 transmission unit type in the recurring timing structure; portion $B_{N-1}$ is to be communicated using a P1 transmission unit type in the recurring timing structure; portion $C_{N-1}$, is to be communicated using a P2 transmission unit type in the recurring timing structure; and portion $D_{N-1}$, is to be communicated using a P3 transmission unit type in the recurring timing structure.

Drawing 650 illustrates that the secure hash function encoding module 604 receives discovery information 652 and time value t2 656 and generates a set of output information including a plurality of portions ($A_N$, $B_N$, $C_N$, $D_N$) as indicated by column 658. In this example, each portion corresponds to 16 information bits as indicated by column 660. Column 662 indicates that there is a correspondence between different encoded output portions and transmission unit types. More particularly, portion $A_N$ is to be communicated using a P0 transmission unit type in the recurring timing structure; portion $B_N$ is to be communicated using a P1 transmission unit type in the recurring timing structure; portion $C_N$, is to be communicated using a P2 transmission unit type in the recurring timing structure; and portion $D_N$ is to be communicated using a P3 transmission unit type in the recurring timing structure.

Input discovery information 602 may be the same or different from input discovery information 632. Similarly, input discovery information 632 may be the same or different from input discovery information 652. In each case, the secure hashing function encoding module 604, may, and in some instances does, include additional inputs, e.g., a key, as needed for operation.

Figure 7:
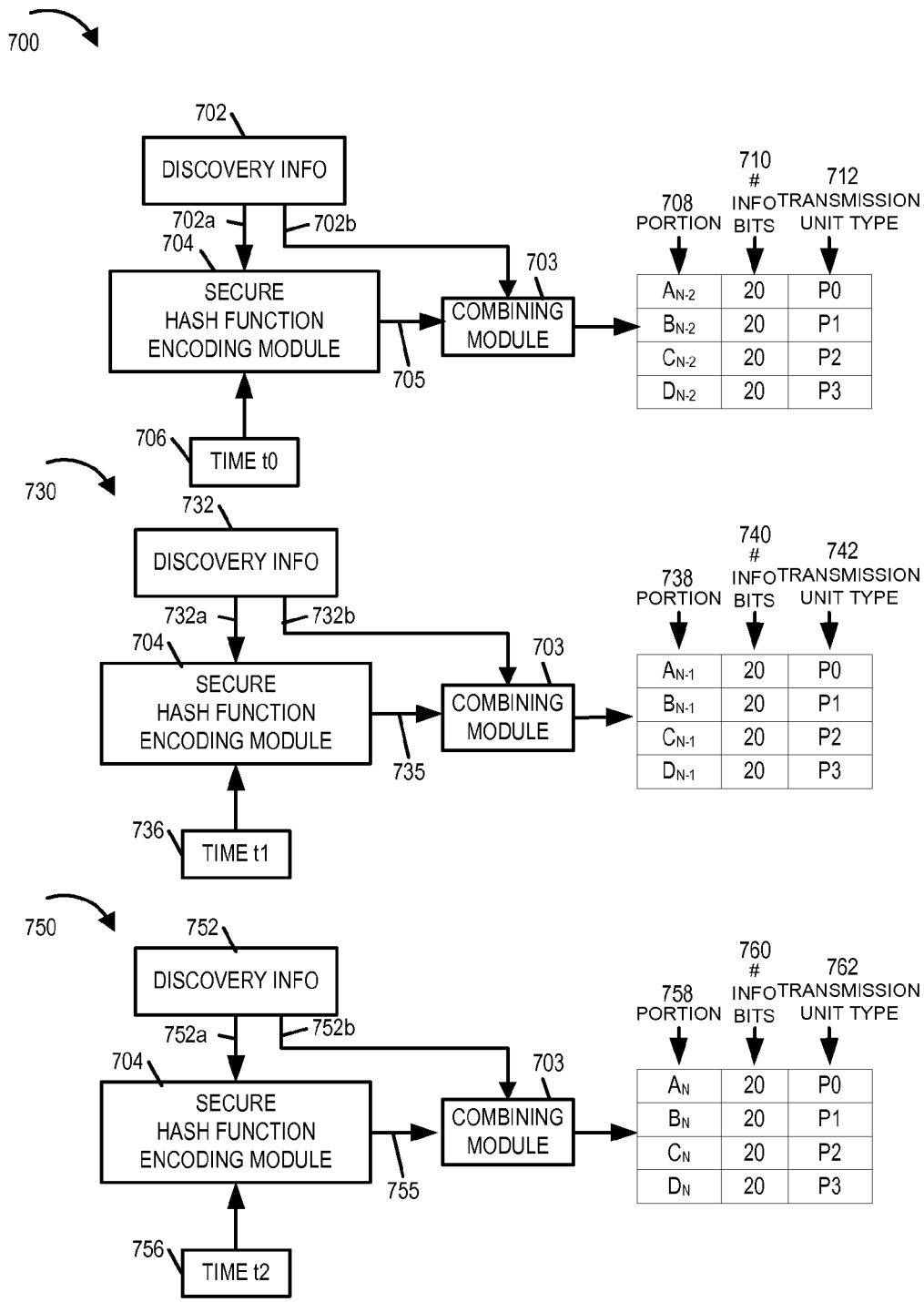
FIG. 7 illustrates a securing hash function encoding module processing some input discovery information, e.g., discovery identification information, which generates secure encoded information.

FIG. 7 illustrates a securing hash function encoding module 704 processing some input discovery information, e.g. discovery identification information, which generates secure encoded information. The output secure encoded information is combined by combining module 703 with additional discovery information, e.g., bits representing type information and/or flags. The result of the combination is mapped to portions, each portion being communicated via a transmission unit.

FIG. 7 thus illustrates a variation on the exemplary embodiment shown in FIG. 6. In the example of FIG. 7 some discovery information which is communicated is not subjected to secure hash function encoding. For example, bits representing type information and/or bits representing flags may be, and sometimes are, not subjected to secure hash function encoding. In the example of FIG. 7, discovery information (702, 732, 752) includes discovery information (702a, 732a, 752a), respectively, which is subjected to secure hash function encoding and discovery information (702b, 732b, 752b), respectively, which is not subjected to secure hash function encoding.

Drawing 700 illustrates that the secure hash function encoding module 704 receives discovery information 702a and time value t0 706 and generates secure encoded information 705. Combining module 703 receives secure encoded information 705 and discovery information 702b and generates a set of output information including a plurality of portions ($A_{N-2}$, $B_{N-2}$, $C_{N-2}$, $D_{N-2}$) as indicated by column 708. In this example, each portion corresponds to 20 information bits as indicated by column 710. Column 712 indicates that there is a correspondence between different encoded output portions and transmission unit types. More particularly, portion $A_{N-2}$ is to be communicated using a P0 transmission unit type in the recurring timing structure; portion $B_{N-2}$ is to be communicated using a P1 transmission unit type in the recurring timing structure; portion $C_{N-2}$, is to be communicated using a P2 transmission unit type in the recurring timing structure; and portion $D_{N-2}$, is to be communicated using a P3 transmission unit type in the recurring timing structure.

Drawing 730 illustrates that the secure hash function encoding module 704 receives discovery information 732a and time value t1 736 and generates secure encoded information 735. Combining module 703 receives secure encoded information 735 and discovery information 732b and generates a set of output information including a plurality of portions ($A_{N-1}$, $B_{N-1}$, $C_{N-1}$, $D_{N-1}$) as indicated by column 738. In this example, each portion corresponds to 20 information bits as indicated by column 740. Column 742 indicates that there is a correspondence between different encoded output portions and transmission unit types. More particularly, portion $A_{N-1}$ is to be communicated using a P0 transmission unit type in the recurring timing structure; portion $B_{N-1}$ is to be communicated using a P1 transmission unit type in the recurring timing structure; portion $C_{N-1}$, is to be communicated using a P2 transmission unit type in the recurring timing structure; and portion $D_{N-1}$, is to be communicated using a P3 transmission unit type in the recurring timing structure.

Drawing 750 illustrates that the secure hash function encoding module 704 receives discovery information 752a and time value t2 756 and generates secure encoded information 755. Combining module 703 receives secure encoded information 755 and discovery information 752b and generates a set of output information including a plurality of portions ($A_N$, $B_N$, $C_N$, $D_N$) as indicated by column 758. In this example, each portion corresponds to 20 information bits as indicated by column 760. Column 762 indicates that there is a correspondence between different encoded output portions and transmission unit types. More particularly, portion $A_N$ is to be communicated using a P0 transmission unit type in the recurring timing structure; portion $B_N$ is to be communicated using a P1 transmission unit type in the recurring timing structure; portion $C_N$, is to be communicated using a P2 transmission unit type in the recurring timing structure; and portion $D_N$, is to be communicated using a P3 transmission unit type in the recurring timing structure.

Input discovery information 702 may be the same or different from input discovery information 732. Similarly, input discovery information 732 may be the same or different from input discovery information 752. In each case, the secure hashing function encoding module 704 may, and in some instances does, include additional inputs, e.g., a key, as needed for operation.

Figure 8:
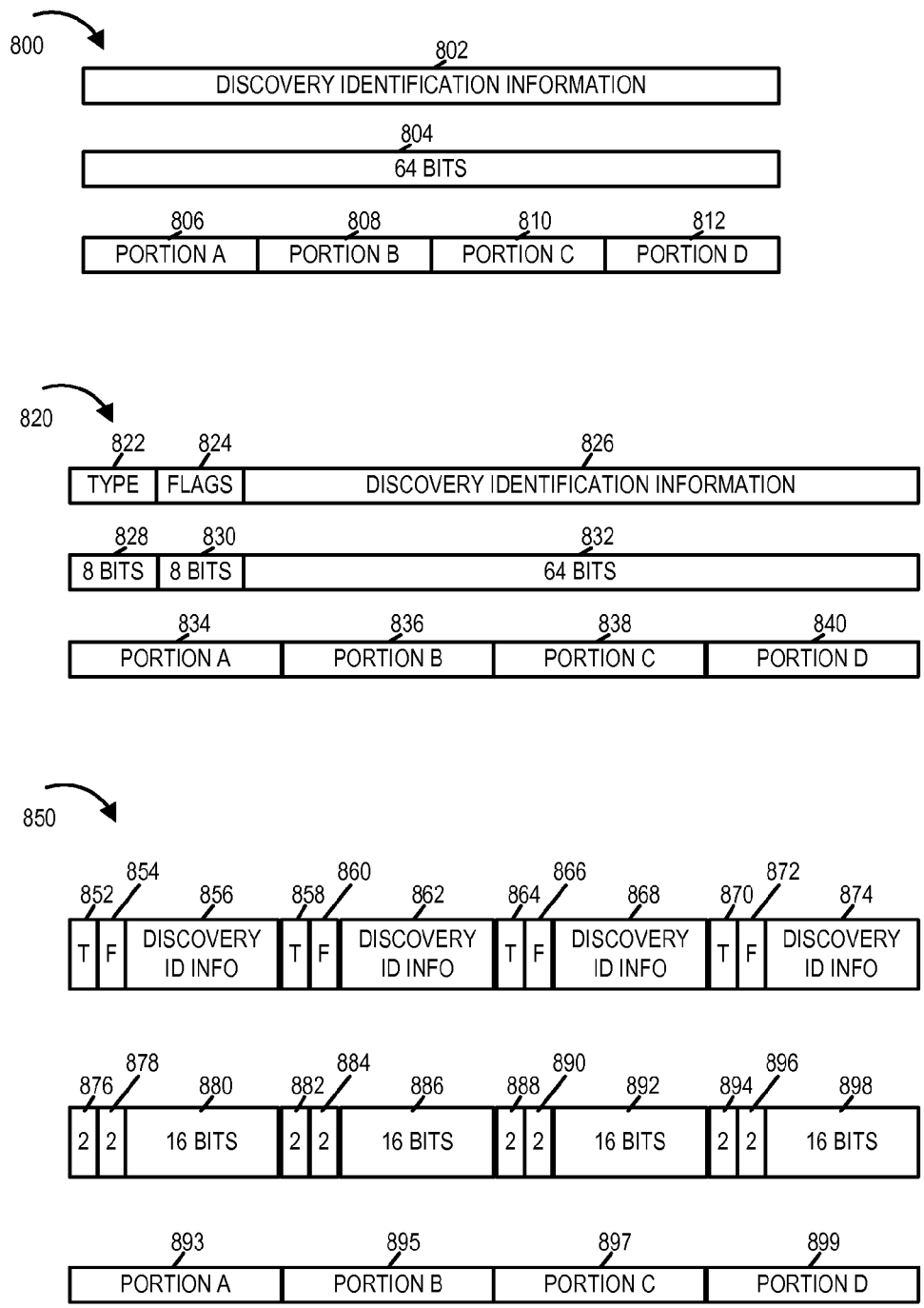
FIG. 8 illustrates 3 exemplary formats for discovery information being conveyed using four output portions corresponding to input discovery information.

FIG. 8 illustrates 3 exemplary formats for discovery information being conveyed using four output portions. Drawing 800 illustrates a first exemplary format in which output discovery identification information 802 to be transmitted includes 64 bits as indicated by block 804 and includes 4 portions (portion A 806, portion B 808, portion C 810, and portion D 812. This format is an exemplary format corresponding to the examples of FIG. 6. For example, the four output portions (portion A 806, portion B 808, portion C 810, portion D 812) of drawing 800 of FIG. 8 are the set of {$A_{n-2}$, $B_{n-2}$, $C_{n-2}$ and $D_{n-2}$}, or the set of four output portions are {$A_{n-1}$, $B_{n-1}$, $C_{n-1}$ and $D_{n-1}$}, or the set {$A_n$, $B_n$, $C_n$ and $D_n$} of FIG. 6.

Drawing 820 illustrates a second exemplary format in which output discovery identification information 834 to be transmitted includes 80 bits and includes 4 output portions (portion A 834, portion B 836, portion C 838, and portion D 840). This format is an exemplary format corresponding to the examples of FIG. 7. For example, the four output portions (portion A 834, portion B 836, portion C 840, portion D 842) of drawing 820 of FIG. 8 are the set of {$A_{n-2}$, $B_{n-2}$, $C_{n-2}$ and $D_{n-2}$}, or the set of four output portions are {$A_{n-1}$, $B_{n-1}$, $C_{n-1}$ and $D_{n-1}$}, or the set {$A_n$, $B_n$, $C_n$ and $D_n$ } of FIG. 7. In example of drawing 820, the output discovery information to be communicated includes a type field 822 which is 8 bits wide as indicated by 828 and a flags field 824 which is 8 bits wide as indicated by block 830 and a discovery identification information field 826 which is 64 bits wide as indicated by block 832. In the example of drawing 820 the type field 822 and the flags field 824 are included as part of portion A 834, while the discovery identification information 826 is communicated using bits in portion A 834, portion B 836, portion C 838 and portion D 840.

Drawing 850 illustrates a third exemplary format in which output discovery identification information 834 to be transmitted includes 80 bits and includes 4 output portions (portion A 893, portion B 895, portion C 897, and portion D 899). This format is an exemplary format corresponding to the examples of FIG. 7. For example, the four output portions (portion A 893, portion B 895, portion C 897, portion D 899) of drawing 850 of FIG. 8 are the set of {$A_{n-2}$, $B_{n-2}$, $C_{n-2}$ and $D_{n-2}$}, or the set of four output portions are {$A_{n-1}$, $B_{n-1}$, $C_{n-1}$ and $D_{n-1}$}, or the set {$A_n$, $B_n$, $C_n$ and $D_n$} of FIG. 7. In the example of drawing 850, the discovery information to be communicated in portion A 893 includes a type field 852 which is 2 bits wide as indicated by block 876, a flags field 854 which is 2 bits wide as indicated by block 878 and a discovery identification information field 856 which is 16 bits wide as indicated by block 880. The discovery information to be communicated in portion B 895 includes a type field 858 which is 2 bits wide as indicated by block 882, a flags field 860 which is 2 bits wide as indicated by block 884 and a discovery identification information field 862 which is 16 bits wide as indicated by block 886. The discovery information to be communicated in portion C 897 includes a type field 864 which is 2 bits wide as indicated by block 888, a flags field 866 which is 2 bits wide as indicated by block 890 and a discovery identification information field 868 which is 16 bits wide as indicated by block 892. The discovery information to be communicated in portion D 899 includes a type field 870 which is 2 bits wide as indicated by 894, a flags field 872 which is 2 bits wide as indicated by block 896 and a discovery identification information field 874 which is 16 bits wide as indicated by block 898.

Type information conveyed in a type field includes, e.g., information indicating a format of other discovery information being conveyed, e.g., other upper layer discovery information. For example, a type value conveyed in the type field is used to identify how to process the discovery information being conveyed, e.g., different type values map to different formats which can be used and/or different encoding which can be used and/or different encryptions which can be used. Type field information can be, and sometimes is, used to convey what the contents of processed, e.g., hashed, discovery information represents.

Flags are used to indicate one or more binary conditions, e.g., capabilities or features. In some embodiments, flags are used to identify a device type, e.g., a router. In some embodiments, a portion of the discovery information to be conveyed is included in every transmission portion. In some embodiments, a portion of the discovery information to be conveyed is split over a set of associated peer discovery transmission portions. Some portions of discovery information, e.g. a subset of flags may be sufficiently time critical to include in every transmission portion. In some embodiments, to be able to interpret some discovery information being communicated, a receiving device needs to have already received a type value; thus in such an embodiment, the frequency at which Type is conveyed can, and sometimes does, impact the ability to react to partial sets of discovery information. In some such embodiments, a type field is included in each discovery transmission portion to facilitate rapid recovery of discovery information being conveyed in a received transmitted portion.

Other embodiments, may include other fields in addition to or in place of those described with respect to FIG. 8, e.g., a header field, a CRC field, etc.

Figure 9:
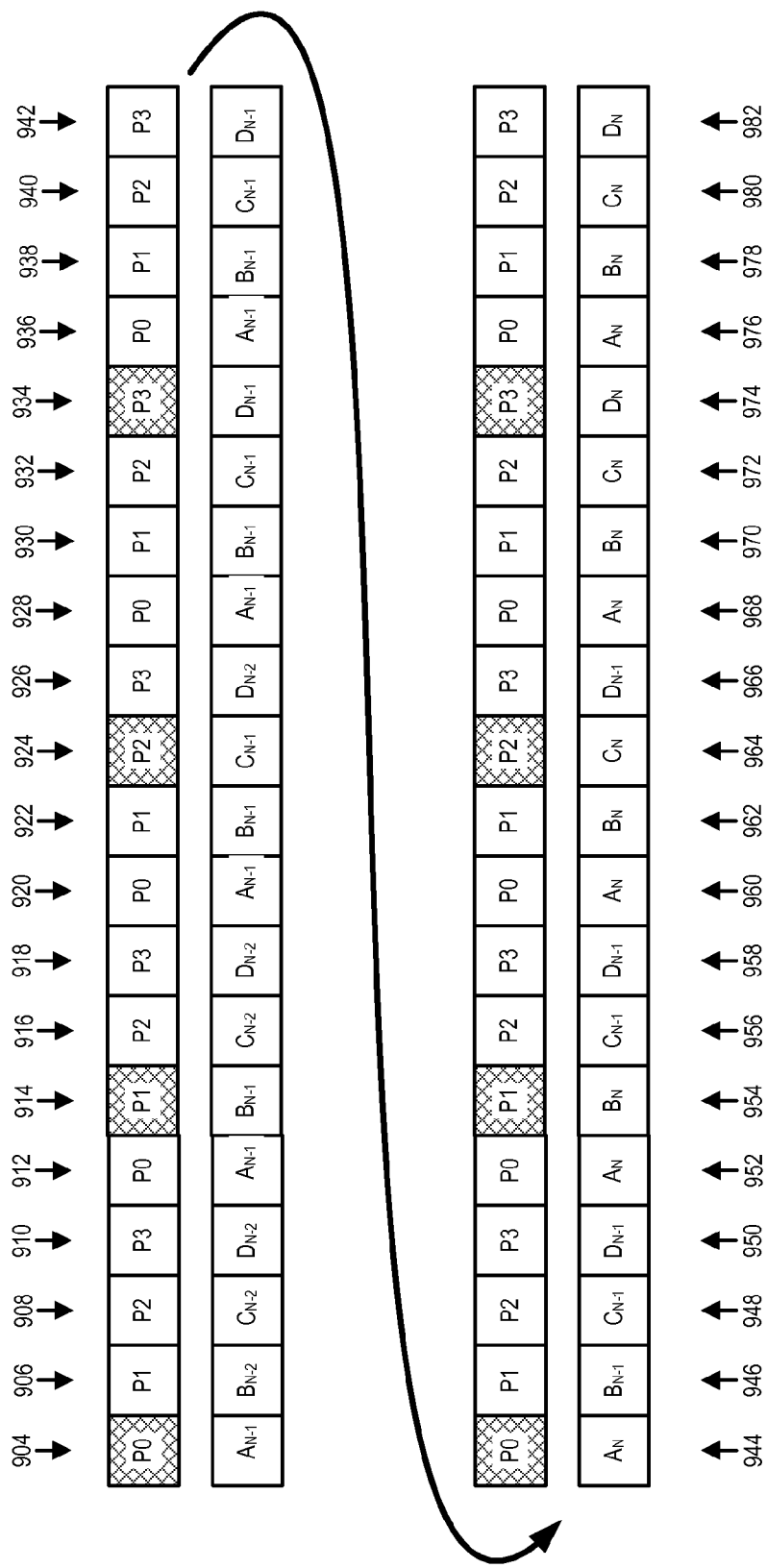
FIG. 9 illustrates mapping of generated portions to ordered transmission units for conveying discovery information associated with a device identifier in accordance with one exemplary embodiment.

FIG. 9 illustrates mapping of the generated portions of FIG. 6 or FIG. 7 to ordered transmission units for conveying discovery information associated with a wireless communications device identifier in accordance with one exemplary embodiment using a particular mapping pattern. An ordered sequence of transmission units (904, 906, 908, 910, 912, 914, 916, 918, 920, 922, 924, 926, 928, 930, 932, 934, 936, 938, 940, 942, 944, 946, 948, 950, 952, 954, 956, 958, 960, 962, 964, 966, 968, 970, 972, 974, 976, 978, 980, 982) which are of the type (P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3), respectively, and which convey information ($A_{N-1}$, $B_{N-2}$, $C_{N-2}$, $D_{N-2}$, $A_{N-1}$, $B_{N-1}$, $C_{N-2}$, $D_{N-2}$, $A_{N-1}$, $B_{N-1}$, $C_{N-1}$, $D_{N-2}$, $A_{N-1}$, $B_{N-1}$, $C_{N-1}$, $D_{N-1}$, $A_{N-1}$, $B_{N-1}$, $C_{N-1}$, $D_{N-1}$, $A_N$, $B_{N-1}$, $C_{N-1}$, $D_{N-1}$, $A_N$, $B_N$, $C_{N-1}$, $D_{N-1}$, $A_N$, $B_N$, $C_N$, $D_{N-1}$, $A_N$, $B_N$, $C_N$, $D_N$, $A_N$, $B_N$, $C_N$, $D_N$), respectively. It may be observed that transmission units (904, 914, 924, 934, 944, 954, 964, and 974) are low rate discovery transmission units as indicated by crosshatch shading, while transmission units (906, 908, 910, 912, 916, 918, 920, 922, 926, 928, 930, 932, 936, 938, 940, 942, 946, 948, 950, 952, 956, 958, 960, 962, 966, 968, 970, 972, 976, 978, 980 and 982) are additional transmission units to be used for high rate discovery. It should be noted, that an additional transmission unit for high rate discovery of a given type is designated to carry the information portion that has been previously transmitted via a low rate discovery transmission unit of the same type, when it carries a transmission unit.

If a first peer to peer communications device having the identifier corresponding to the set of transmission units is in high rate discovery information transmit mode, it transmits using each of the transmission units. However, if first the peer to peer communications device is in low rate discovery transmit mode it transmits using the low rate discovery resources, but refrains from transmitting on the additional transmission resources designated for high rate discovery. The structure of FIG. 9 illustrates the dissemination of the same portions of discovery information from a first peer to peer communications irrespective of the transmit mode, but facilitates a more rapid potential recovery of the information by a second peer to peer device if high rate mode is used. In addition, this illustrated structure of FIG. 9 advantageously facilitates a peer discovery assist node or base station being able to: (i) receive and detect discovery signals being communicated from a first peer to peer communications device transmitting discovery signals using low discovery rate transmission units but not additional transmission units designated for high discovery rate, and (ii) then broadcast such received information using the additional transmission units designated for high rate discovery, e.g., filling in the otherwise unused additional transmission units designated for high rate discovery. A second peer to peer communications device attempting to detect peer discovery information from the first peer discovery device can receive and process discovery transmission units which occur on each of the transmission units associated with the device identifier. The second peer to peer communications device need not know the transmission source of a particular additional transmission unit signal, e.g., the first communications device or the assist node.

Figure 10:
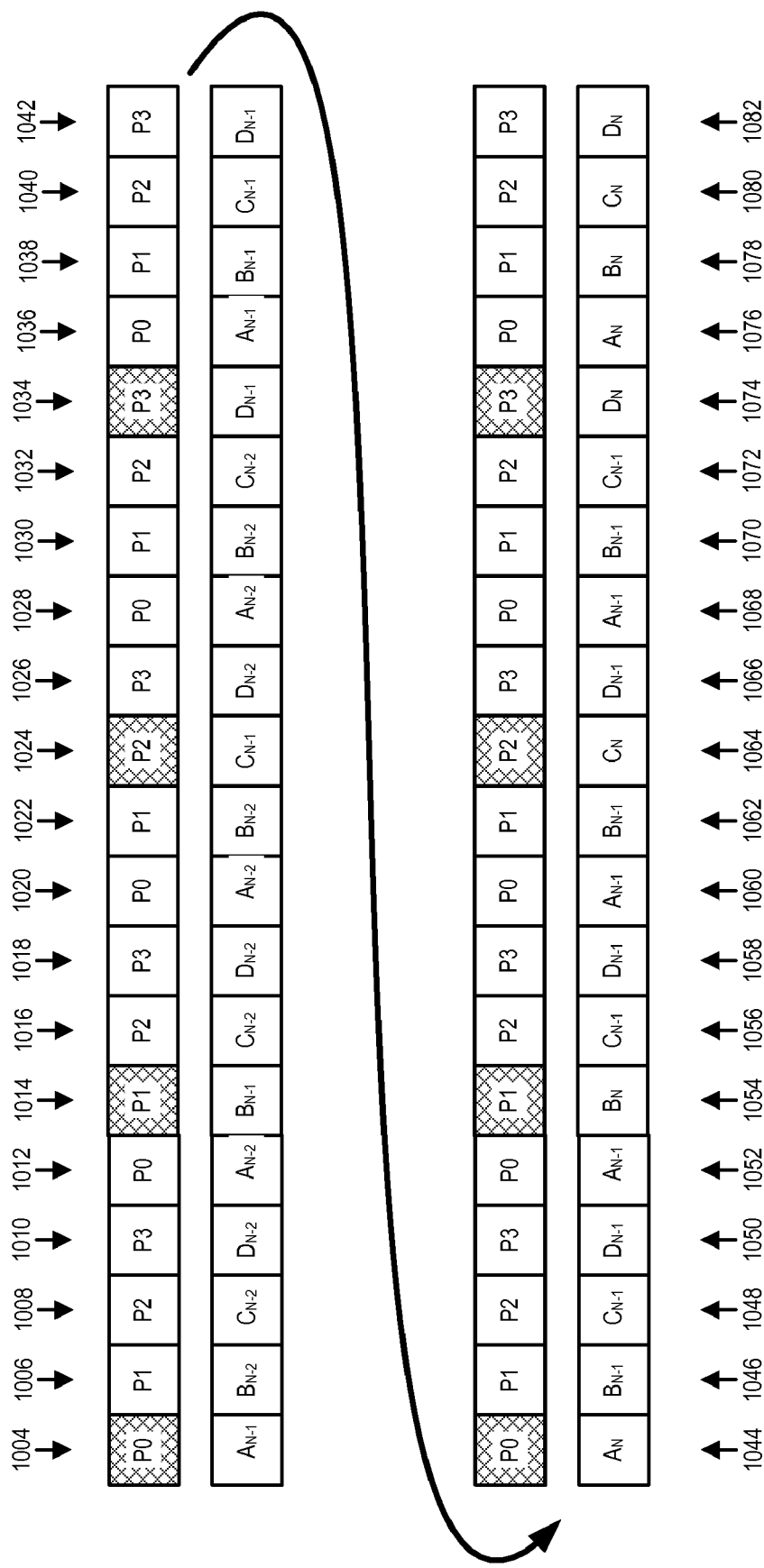
FIG. 10 illustrates mapping of generated portions to ordered transmission units for conveying discovery information associated with a device identifier in accordance with another exemplary embodiment.

FIG. 10 illustrates mapping of the generated portions of FIG. 6 or FIG. 7 to ordered transmission units for conveying discovery information associated with a wireless communications device identifier in accordance with another exemplary embodiment. An ordered sequence of transmission units (1004, 1006, 1008, 1010, 1012, 1014, 1016, 1018, 1020, 1022, 1024, 1026, 1028, 1030, 1032, 1034, 1036, 1038, 1040, 1042, 1044, 1046, 1048, 1050, 1052, 1054, 1056, 1058, 1060, 1062, 1064, 1066, 1068, 1070, 1072, 1074, 1076, 1078, 1080, 1082) which are of the type (P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3), respectively, and which convey information ($A_{N-1}$, $B_{N-2}$, $C_{N-2}$, $D_{N-2}$, $A_{N-2}$, $B_{N-1}$, $C_{N-2}$, $D_{N-2}$, $A_{N-2}$, $B_{N-2}$, $C_{N-1}$, $D_{N-2}$, $A_{N-2}$, $B_{N-2}$, $C_{N-2}$, $D_{N-1}$, $A_{N-1}$, $B_{N-1}$, $C_{N-1}$, $D_{N-1}$, $A_N$, $B_{N-1}$, $C_{N-1}$, $D_{N-1}$, $A_{N-1}$, $B_N$, $C_{N-1}$, $D_{N-1}$, $A_{N-1}$, $B_{N-1}$, $C_N$, $D_{N-1}$, $A_{N-1}$, $B_{N-1}$, $C_{N-1}$, $D_N$, $A_N$, $B_N$, $C_N$, $D_N$), respectively. It may be observed that transmission units (1004, 1014, 1024, 1034, 1044, 1054, 1064, and 1074) are low rate discovery transmission units as indicated by crosshatch shading, while transmission units (1006, 1008, 1010, 1012, 1016, 1018, 1020, 1022, 1026, 1028, 1030, 1032, 1036, 1038, 1040, 1042, 1046, 1048, 1050, 1052, 1056, 1058, 1060, 1062, 1066, 1068, 1070, 1072, 1076, 1078, 1080 and 1082) are additional transmission units to be used for high rate discovery. It should be noted, that an additional transmission unit for high rate discovery is designated to carry an information portion that has been previously transmitted via a low rate discovery transmission unit, when it carries a transmission unit. In this example, the information carried on the additional resources associated with high rate discovery does not change until a complete set of low rate discovery information has been transmitted.

Figure 11:
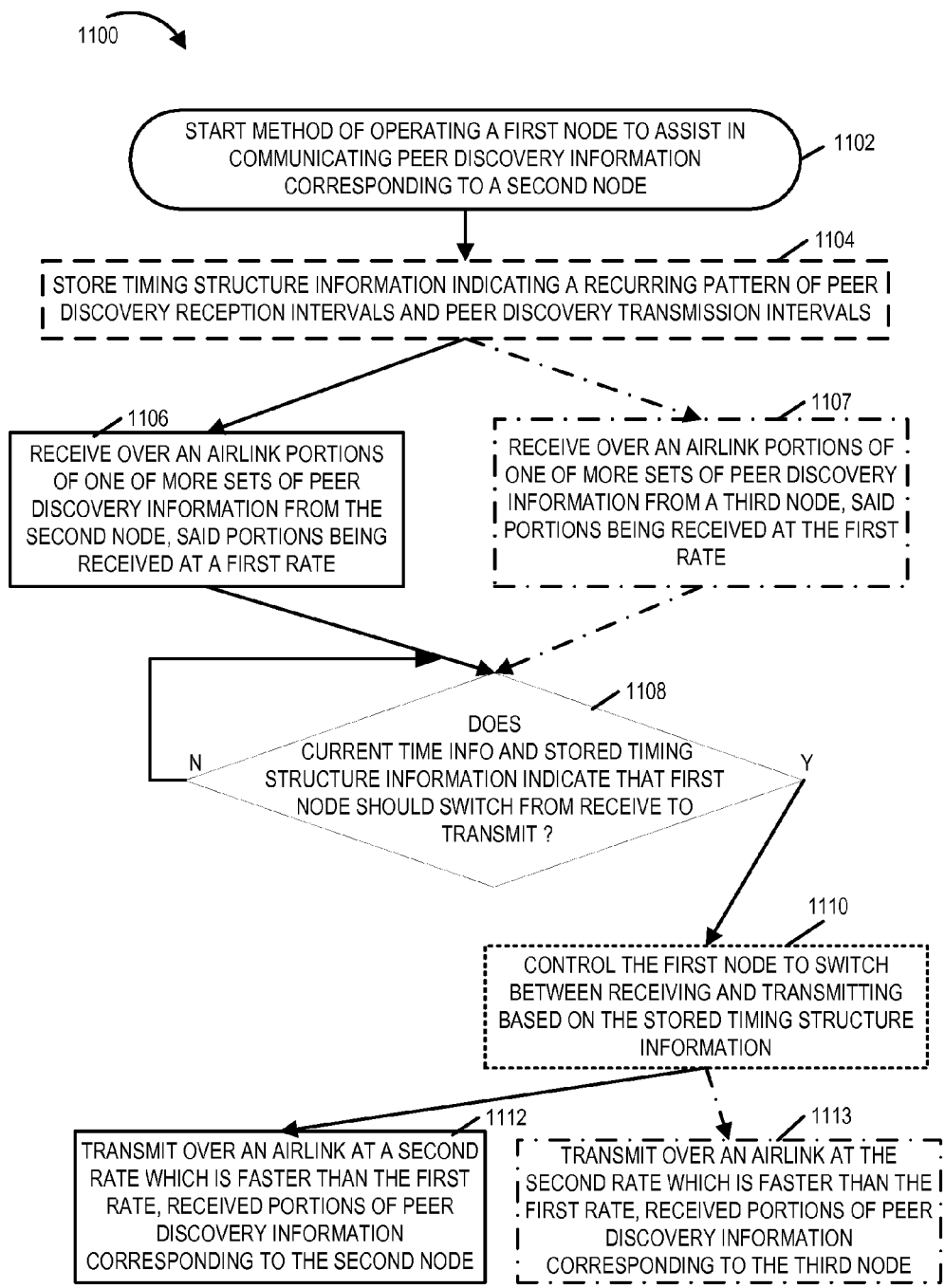
FIG. 11 is a flowchart of an exemplary method of operating a first node to assist in communicating peer discovery information corresponding to a second node.

FIG. 11 is a flowchart 1100 of an exemplary method of operating a first node to assist in communicating peer discovery information corresponding to a second node. The first node is, e.g., one of peer discovery assist node 114 and server node 112, of system 100 of FIG. 1, and the second node is, e.g., one of peer to peer communications devices (102, 104, 106, 108, 110) of system 100 of FIG. 1. Steps 1104, 1108 and 1110 are optional steps which are included in some, but not necessarily all, embodiments. Steps 1107 and 1113 are also optional steps included in some, but not necessarily all, embodiments, e.g., included in an embodiment in which the first node is assisting in communicating peer discovery information corresponding to both a second node and a third node.

In one embodiment in which steps 1104, 1108 and 1110 are omitted, operation proceeds from step 1102 to step 1106 and from step 1106 to step 1112. In another exemplary embodiment in which steps 1104, 1108 and 1110 are omitted, operation proceeds from step 1102 to step 1106 and 1107; operation proceeds from step 1106 to step 1112, and operation proceeds from step 1107 to step 1113.

The flowchart will be described for an embodiment in which steps 1104, 1108 and 1110 are included. Operation starts in step 1102 and proceeds to step 1104, in which the first node stores timing structure information indicating a recurring pattern of peer discovery reception intervals and peer discovery transmission intervals. Operation proceeds from step 1104 to step 1106. In step 1106, the first device receives, over an airlink, portions of one or more sets of peer discovery information from a second node, said portions being received at a first rate. Operation proceeds from step 1106 to step 1108.

In step 1108, the first device determines if the current time information and the stored timing structure information indicate that the first node should switch from receive to transmit. If the determination of step 1108 is not to switch, then operation proceeds back to the input of step 1108. However, if the determination of step 1108 is to switch, then operation proceeds from step 1108 to step 1110. In step 1110 the first node is controlled to switch between receiving and transmitting based on the stored timing structure information. Operation proceeds from step 1110 to step 1112. In step 1112 the first device transmits over an airlink at a second rate which is faster than the first rate, received portions of peer discovery information corresponding to the second node.

In some embodiments, transmitting over an airlink at a second rate includes transmitting individual received portions of a set of peer discovery information multiple times. In some embodiments, transmitting over an airlink at a second rate includes transmitting a full set of peer discovery information for each received portion of peer discovery information.

In some embodiments, a set of peer discovery information includes N portions and each of the N portions is transmitted N times.

In some embodiments, a previously received set of peer discovery information is transmitted between two consecutively received portions of peer discovery information.

In some embodiments, the first node supports concurrent discovery assistance to a plurality of nodes which are transmitting discovery information at a low rate. For example, in some embodiments, the first node also assists in communicating peer discovery information corresponding to a third node. In one such embodiment, the method of flowchart 1100 includes steps 1107 and 1113. In step 1107, which may be performed in parallel with step 1106 in one embodiment, the first node receives, over an airlink, portions of one or more sets of peer discovery information from the third node, said portions being received at the first rate. In step 1113, which may be performed in parallel to step 1112 in one embodiment, the first node transmits over an airlink at the second rate which is faster than the first rate, received portions of peer discovery information corresponding to the third node.

In some exemplary embodiments step 1107 is performed in series with step 1106. In some exemplary embodiments step 1113 is performed in series with step 1112.

Figure 12A:
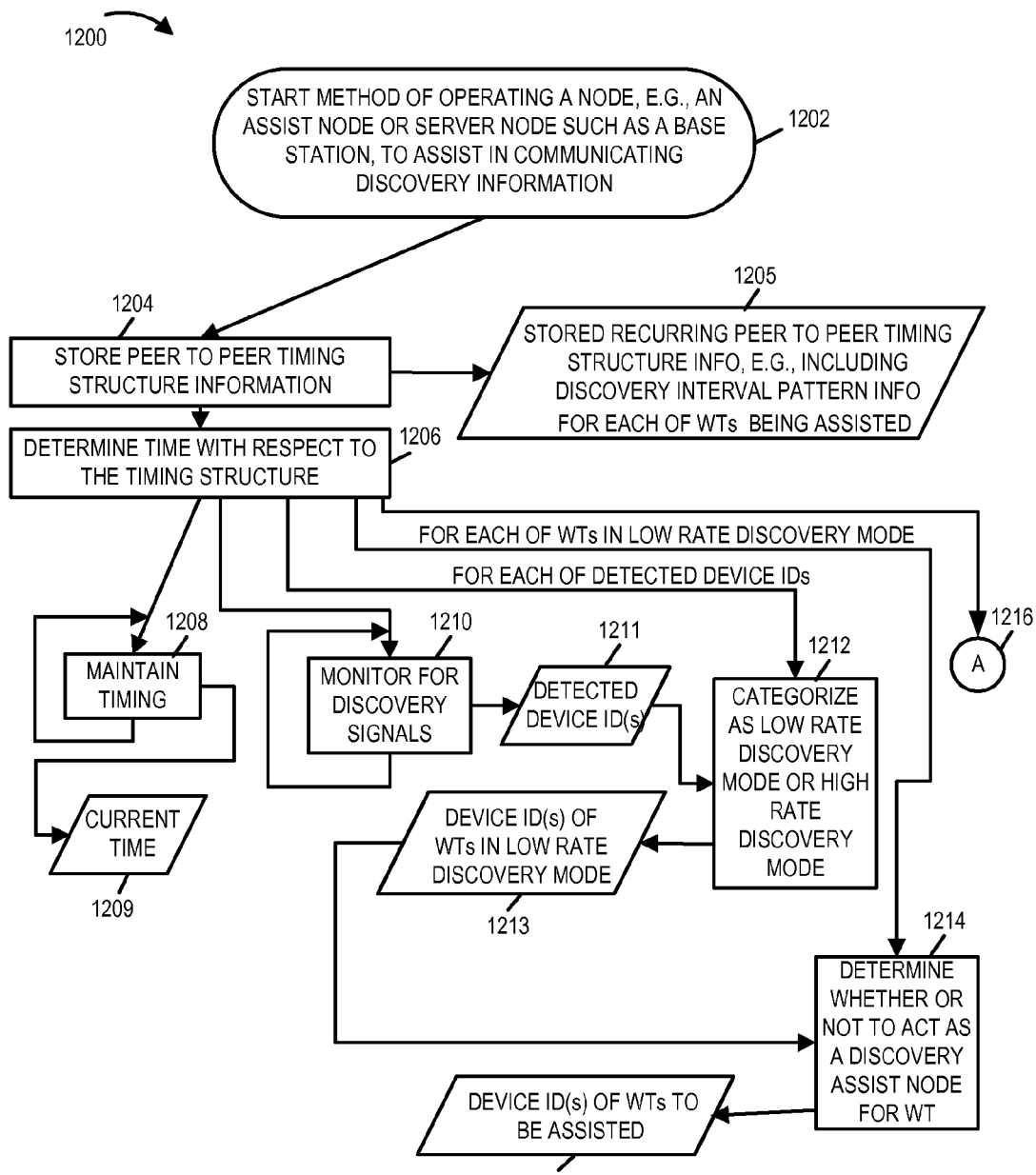
FIG. 12, comprising the combination of FIG. 12A and FIG. 12B, is a flowchart of an exemplary method of operating a node, e.g., an assist node or a server node such as a base station, to assist in communicating discovery information.
Figure 12B:
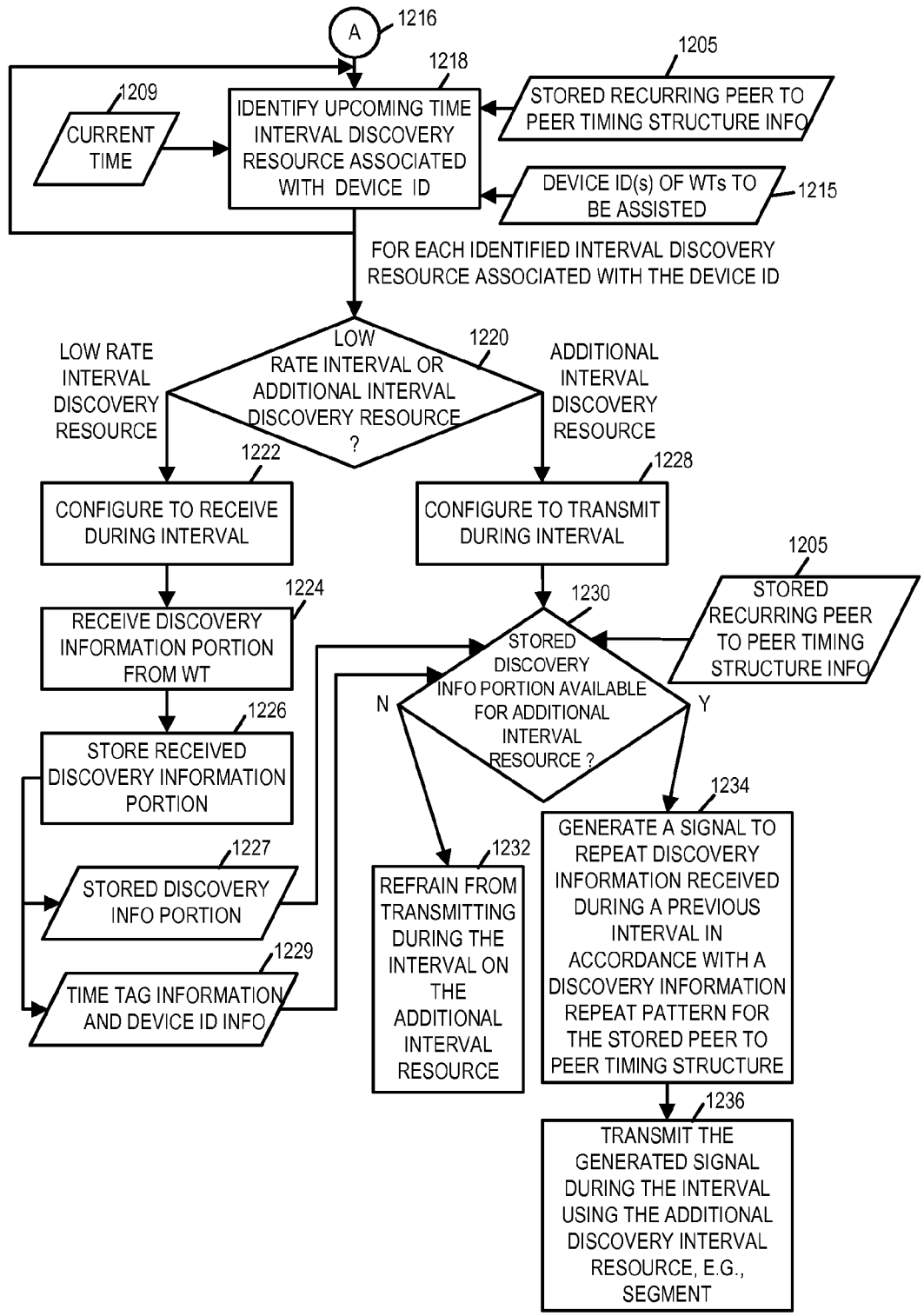

FIG. 12 is a flowchart 1200 of an exemplary method of operating a node, e.g., an assist node or a server node such as a base station, to assist in communicating discovery information. Operation of the exemplary method starts in step 1202 and proceeds to step 1204, where the node stores peer to peer timing structure information as stored peer to peer timing structure information 1205. The storing of step 1205 is, e.g., part of a node configuration and/or node initialization process. The stored peer to peer timing structure information 1205 includes, e.g., information identifying a plurality of discovery interval air link resources, information associating particular discovery interval air link resources with particular device identifiers and information indicating a recurring discovery interval pattern.

Operation proceeds from step 1204 to step 1206, in which the node determines time with respect to the peer to peer timing structure. In some embodiments, a reference signal is received via the backhaul to coordinate timing, while in other embodiments, a reference signal is received via the air interface to determine time and synchronize with respect to the peer to peer timing structure. Operation proceeds from step 1206 to step 1208. In step 1208, which is performed on an ongoing basis, the node maintains timing and outputs current time 1209.

Operation also proceeds from step 1206 to steps 1210, 1212, 1214 and connecting node A 1216. In step 1210, which is performed on an ongoing basis, the node monitors for discovery signals, e.g., from peer to peer wireless terminals in its local vicinity which are transmitting. Detected device IDs 1211 is an output of monitoring 1210. In some embodiments, at different times different devices may be associated with the same device identifier. For example, a device identifier, associated with a particular set of discovery interval air link resources which map to that ID, is temporarily acquired by and held by a wireless terminal which desires to be active.

Step 1212 is performed for each of one or more of the detected device IDs. In step 1212, the node categorizes the wireless terminal associated with the device ID as being in one of a low rate discovery node or a high rate discovery mode. For example, if the node detects discovery signals during the low rate discovery intervals associated with the device ID on the air link resource associated with the device ID but does not detect discovery signals during the additional discovery intervals associated with the device ID on the air link resources associated with the device ID, the node concludes that the wireless terminal currently associated with the device ID is operating in low rate mode of transmitting discovery information. Conversely if the node detects discovery signals on the air link resources associated with the device ID corresponding to both low rate discovery resources and additional resources, the node concludes that the wireless terminal associated with the device ID is to be categorized as being in high rate discovery mode of transmitting discovery information. Detected device IDs 1211 is an input to step 1212, while device IDs of wireless terminals in low rate discovery mode 1213 is an output of step 1212.

Step 1214 is performed for each of the wireless terminals in low rate discovery mode. In step 1214, the node determines whether or not to act as a discovery assist node for the wireless terminal. Information 1215, identifying the device IDs of wireless terminals to be assisted by the node, is an output of step 1214.

Operation proceeds from step 1206 via connecting node A 1216 to step 1218 for each of the wireless terminals being assisted in accordance with information 1215. In step 1218, which is performed on an ongoing basis, the node identifies an upcoming time interval discovery resource associated with the device ID currently held by the WT being assisted. Current time 1209, stored recurring peer to peer timing structure information 1205 and device IDs of wireless terminals to be assisted 1215 are inputs to step 1218. Operation proceeds from step 1218 to step 1220 for each identified interval discovery resource associated with the device identifier.

In step 1220 the node determines whether the identified interval discovery resource is a low rate interval discovery resource or an additional interval discovery resource. If the identified interval air link resource is a low rate interval air link discovery resource, then operation proceeds from step 1220 to step 1222; however, if the identified interval discovery resource is an additional interval air link discovery resource, then operation proceeds from step 1220 to step 1228.

Returning to step 1222, in step 1222 the node configures to receive during the interval. Then, in step 1224 the node receives a discovery information portion from the wireless terminal associated with the device ID. Operation proceeds from step 1224 to step 1226. In step 1226, the node stores the received discovery information portion as stored discovery information portion 1227 and also stores time tag information and device ID information associated with the received discovery information portion as information 1229.

Returning to step 1228, in step 1228 the node configures to transmit during the interval. Operation proceeds from step 1228 to step 1230. In step 1230 the node checks as to whether or not an appropriate stored discovery information portion is available to be transmitted using the additional interval resource in accordance with transmission pattern information. Step 1230 uses as inputs available pairs of stored information (1227, 1229) and stored recurring timing structure information 1205. Note that a particular discovery information portion, scheduled for retransmission in the identified interval using the additional interval discovery resource in accordance with timing structure, may be unavailable to the node, e.g., due to the wireless terminal having just started transmitting or due to a failed reception of a discovery signal portion because of a weak signal or because of interference.

If in step 1230, the node determines that the stored information which is scheduled for transmission during the identified interval is not available, then operation proceeds from step 1230 to step 1232, where the node refrains from transmitting during the interval on the additional interval air link resource. However, if in step 1230 the node determines that the stored information which is scheduled for transmission during the identified interval is available for transmission, then operation proceeds from step 1230 to step 1234 where the node generates a signal to repeat discovery information received during a previous interval in accordance with a discovery information repeat pattern for the stored peer to peer timing structure. Operation proceeds from step 1234 to step 1236 in which the node transmits the generated signal during the interval using the additional discovery interval air link resource, e.g., segment. When the node performs step 1236, the node is acting as a proxy for the wireless terminal in low rate discovery information transmit mode, transmitting the same information during that interval that the wireless terminal would have transmitted if it had been in high rate discovery information transmit mode. This proxy operation facilitates the rapid recovery of the discovery information by another peer to peer device.

In one exemplary embodiment, in which low rate discovery information portions are generated in sets of N portions, when in a steady state of operation providing discovery assistance for a wireless terminal, for one execution of the reception of a discovery information portion from the wireless terminal, e.g., step 1224, there are N executions of step 1236 in which the node retransmits a received discovery information portion. In the example, of the example of FIG. 14, N=4. FIGS. 9 and 10 illustrate two exemplary patterns which may be utilized by a wireless terminal and an assist node. With respect to FIG. 9 or 10, consider that a wireless terminal is in low rate discovery mode and transmits using the low rate discovery interval air link resources, identified by crosshatch shading, and is quiescent with regard to the discovery interval additional air link resources identified by no shading. Now consider that an assist node executing the method of flowchart 1200 of FIG. 12, receives during the low rate discovery intervals on the low rate air link resources identified by crosshatch shading, and stores away the received portions for later retransmission. Also consider that the assist node transmits during the additional discovery intervals using the additional discovery interval air link resources identified by no shading. It may be observed that discovery information portions corresponding to an additional discovery interval communicate information which had been transmitted in a prior low rate discovery interval in accordance with the recurring structure.

Figure 13:
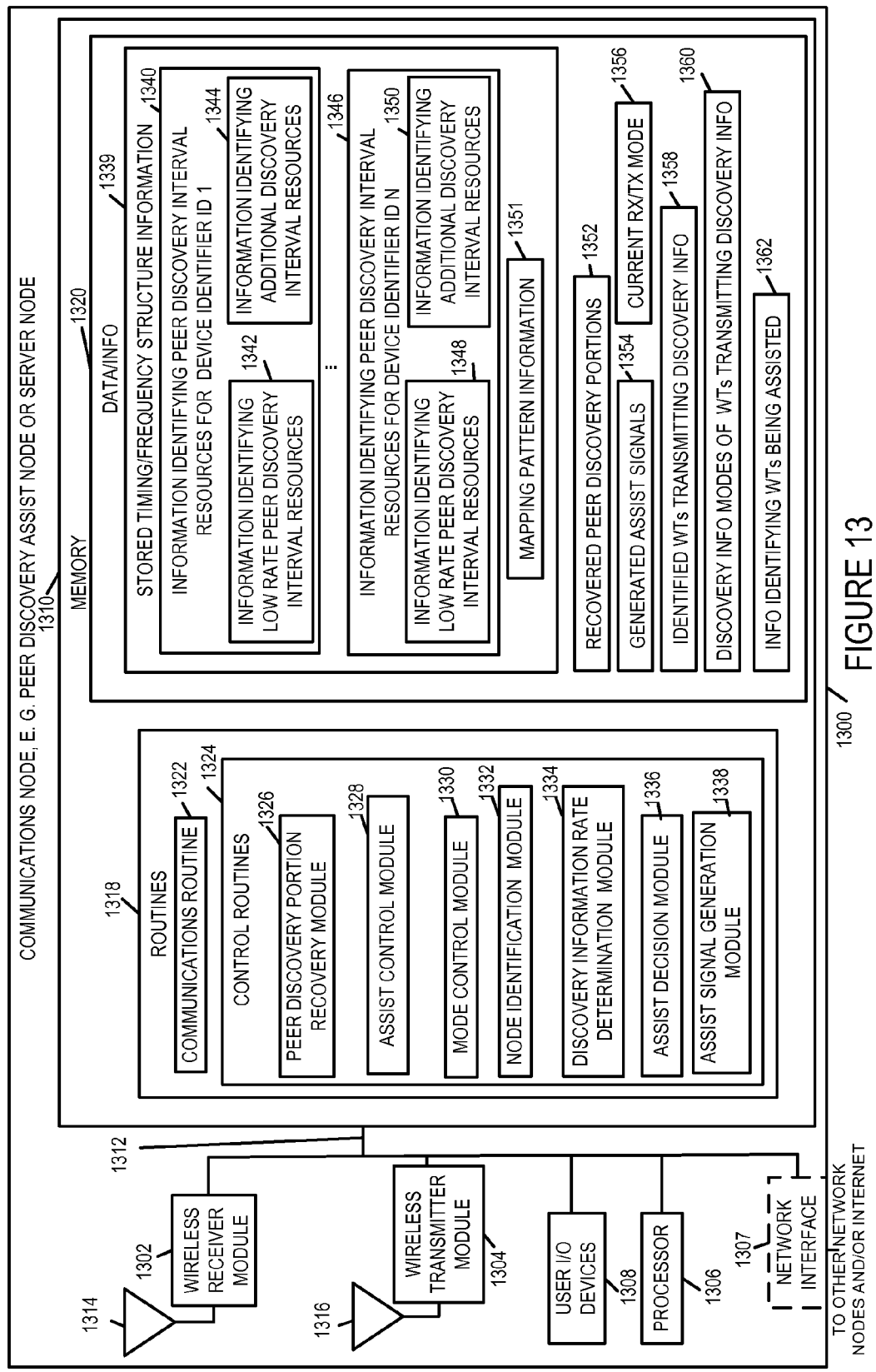
FIG. 13 is a drawing of an exemplary communications node, e.g., a peer discovery assist node or server node such as a base station node, in accordance with an exemplary embodiment.

FIG. 13 is a drawing of an exemplary communications node 1300, e.g., a peer discovery assist node or server node such as a base station node, in accordance with an exemplary embodiment. Exemplary communications node 1300 is, e.g., one of peer discovery assist node 114 and server node 112 of system 100 of FIG. 1.

Communications node 1300 includes a wireless receiver module 1302, a wireless transmitter module 1304, a processor 1306, user I/O devices 1308, and a memory 1310 coupled together via a bus 1312 over which the various elements may interchange data and information. In some embodiments, communications node 1300 also includes network interface 1307 which is coupled to bus 1312. Network interface 1307 couples the communications node 1300 to other network nodes and/or the Internet, e.g., via a wired backhaul network.

Memory 1310 includes routines 1318 and data/information 1320. The processor 1306, e.g., a CPU, executes the routines 1318 and uses the data/information 1320 in memory 1310 to control the operation of the communications node 1300 and implement methods, e.g., the method of flowchart 1100 of FIG. 11 or the method of flowchart 1200 of FIG. 12.

Wireless receiver module 1302, e.g., an OFDM or CDMA receiver, is coupled to receive antenna 1314 via which the communications device 1300 receives signals from other wireless devices, e.g., peer discovery information signals conveying portions of peer discovery information from peer to peer device devices. In some embodiments, the communications device 1300 synchronizes to a timing structure, e.g., a peer to peer recurring timing structure, via one or more signals received via wireless receiver module 1302, e.g., a via a received OFDM beacon signal from beacon transmitter 116.

Wireless transmitter module 1304, e.g., an OFDM or CDMA transmitter, is coupled to transmit antenna 1316 via which the communications node 1300 transmits signals to wireless devices. Transmitted signals include signals conveying received peer discovery information portions which are being broadcast to assist in communicating peer discovery information at a higher rate.

Wireless receiver module 1302 receives over an airlink portions of one or more sets of peer discovery information from another node, e.g., a first peer to peer wireless terminal, said portions being received at a first rate. Wireless transmitter module 1304 transmits over an airlink at a second rate which is faster than the first rate, received portions of peer discovery information corresponding to the another node. In some embodiments, transmitting over an airlink at a second rate includes transmitting individual received portion of a set of peer discovery information multiple times. In some embodiments, transmitting over an airlink at a second rate includes transmitting a full set of peer discovery information for each received portion of a set of peer discovery information. In some embodiments, a set of peer discovery information includes N portions and each of the N portions is transmitted N times. In some embodiments, a previously received set of peer discovery information is transmitted between two consecutively received portions of peer discovery information. In some embodiments, the communications node 1300 supports discovery assistance for multiple devices concurrently, e.g., retransmitting received recovered discovery information portions corresponding to two or more different wireless terminals broadcasting discovery information at a low rate in accordance with a recurring timing and frequency structure recognized by the communications node and the two or more different wireless terminals.

User I/O devices 1308 include, e.g., microphone, keyboard, keypad, camera, speaker, display, etc. User I/O devices 1308 allow an operator of communications device 1300 to input data/information, access output data/information, and control at least some functions of the communications node 1300, e.g., activate peer discovery assist functionality, input peer discovery assist determination and/or screening criteria, etc., control configuration, and/or control loading of timing/frequency structure information.

Network interface 1307 couples the communications node 1300 to other network nodes, e.g., servers, routers, base stations, AAA node, system control nodes, timing reference nodes, etc., and/or the Internet. In some embodiments, communications node 1300 synchronizes to a timing structure, e.g., a peer to peer recurring timing structure, via signaling communicated over the network interface 1307.

Routines 1318 include a communications routine 1322 and control routines 1324. The communications routine 1322 implements the various communications protocols used by the communications node 1300. The control routines 1324 include a peer discovery portion recovery module 1326, an assist control module 1328, a mode control module 1330, a node identification module 1332, a discovery information rate determination module 1334, an assist decision module 1336 and an assist signal generation module 1338. Data/information 1320 includes stored timing structure information 1339, recovered peer discovery portions 1352, generated assist signals 1354, information identifying a current receive/transmit mode 1356, identified wireless terminals transmitting discovery information 1358, information identifying the discovery information modes of wireless terminals transmitting discovery information 1360, and information identifying wireless terminals being assisted 1362.

Peer discovery portion recovery module 1326 recovers received portions of peer discovery information being communicated from other devices, e.g., portions of peer discovery information being communicated from peer to peer wireless devices being communicated using low rate peer discovery air link resources. Recovered peer discovery portions 1352 include stored recovered received peer discovery portions from peer discovery portion recovery module 1326. Some transmitted peer discovery portions of interest may not be recovered, e.g., due to a weak received signal or interference. In various embodiments, although a discovery information portion may be successfully recovered by module 1326 and available for subsequent re-transmission, some or all of the underlying pre-encryption discovery information is not accessible to node 1300. For example, device 1300 may not include a particular decryption module or have access to a key needed to decrypt an encrypted discovery information portion. Thus device 1300 can perform proxy assistance, yet security may be maintained between trusted and/or authorized users. Stored recovered received peer discovery portions 1352 are available for later retransmission, e.g., during an appropriate additional discovery interval in accordance with the timing/frequency structure information.

Assist control module 1328 controls the wireless transmitter module 1304 to transmit assist signals conveying received recovered portions of peer discovery information corresponding to another node, e.g., a peer to peer wireless terminal, at a second rate. The second rate at which the communications node 1300 is controlled to transmit received recovered portions of peer discovery information corresponding to another node is faster than a first rate at which the communications node 1300 is controlled to receive peer discovery information portions from the another node. For example, in the example of FIG. 14, the assist node transmits four received recovered discovery information portions for each received recovered portion.

In various embodiments, transmitting over an airlink at a second rate includes transmitting individual received portions of a set of peer discovery information multiple times. For example consider that communications node 1300 is a timing/frequency structure in accordance with FIG. 9, that a wireless terminal in low rate discovery transmit mode is transmitting discovery information portions using the low rate discovery air link resources indicated by crosshatch shading, and that the communications node 1300 is transmitting using the additional discovery interval resources indicated by no shading. In such a scenario, device 1300 received and recovers discovery information portion $A_{N-1}$ as indicated by arrow 904, but subsequently transmits portion $A_{N-1}$ four times as indicated by arrows 912, 920, 928, and 936. Similarly, device 1300 receives and recovers discovery information portion $B_{N-1}$ as indicated by arrow 914, but subsequently transmits portion $B_{N-1}$ four times as indicated by arrows 922, 930, 938, and 946. Similarly, device 1300 receives and recovers discovery information portion $C_{N-1}$ as indicated by arrow 924, but subsequently transmits portion $C_{N-1}$ four times as indicated by arrows 932, 940, 948, and 946. Similarly, device 1300 receives and recovers discovery information portion $D_{N-1}$ as indicated by arrow 934, but subsequently transmits portion $D_{N-1}$ four times as indicated by arrows 942, 950, 958, and 966.

In some embodiments, transmitting over an airlink at a second rate includes transmitting a full set of peer discovery information for each received portion of peer discovery information. Continuing with the above example using FIG. 9, there are 4 full sets of peer discovery information transmitted corresponding to four received portions of the set of peer discovery, where the set of peer discovery information is the set of {portion $A_{N-1}$, portion $B_{N-1}$, portion $C_{N-1}$, portion $D_{N-1}$}.

In some embodiments, a set of peer discovery information includes K portions and each of the K portions is transmitted N times. Further continuing with the above example using FIG. 9, a set of peer discovery information has four portions, so K=4, and each of the four portions is transmitted 4 times.

In some embodiments, a previously received set of peer discovery information can be, and sometimes is, transmitted between two consecutively received portions of peer discovery information. Continuing with the above example using FIG. 9, previously received set of peer discovery information $\{A_{N-1}, B_{N-1}, C_{N-1}, D_{N-1}\}$ is transmitted between consecutively received portions $D_{N-1}$ and $A_N$ as indicated by arrows 934, 936, 938, 940, 942, 944. Now consider the alternative timing/frequency mapping pattern illustrated by FIG. 10, and again assume that communications device 1300 receives for low rate discovery interval resources indicated by crosshatch shading and transmits for additional discovery interval resources indicated by no shading. In this exemplary embodiment, a previously received set of peer discovery information is transmitted between two consecutively received portions of peer discovery information. For example, between received portions $A_N$ and $B_N$, as indicated by arrows 1044 and 1054, the previously received set of peer discovery information $\{A_{N-1}, B_{N-1}, C_{N-1}, D_{N-1}\}$ is transmitted as indicated by arrows 1052, 1046, 1048, 1050. Similarly, between received portions $B_N$ and $C_N$, as indicated by arrows 1054 and 1064, the previously received set of peer discovery information $\{A_{N-1}, B_{N-1}, C_{N-1}, D_{N-1}\}$ is transmitted as indicated by arrows 1060, 1062, 1056, 1058.

Mode control module 1330 controls the communications node to switch between receiving and transmitting based on the stored timing structure information. Current Rx/TX mode 1356 identifies whether the node 1300 is in a receive mode, e.g., for receiving discovery information in a low rate peer discovery interval, or in a transmit mode, e.g., for transmitting discovery information in an additional discovery interval.

Node identification module 1332 identifies that peer discovery information is being transmitted from wireless terminals which currently correspond to particular identifiers. In some embodiments, particular air link resources, e.g., segments, in the timing/frequency structure are associated with particular device identifiers. Thus by detecting a discovery information portion on a particular low rate discovery interval resource, communications node 1300 can identify that a wireless terminal associated with that device identifier is currently active with regard to the broadcasting of discovery information. Identified wireless terminals transmitting discovery information 1358 is an output of node identification module 1330. For example, each of a plurality of identifiers may be associated with a set of air link resources designated for peer discovery. If communications node 1300 has recovered a received peer discovery signal on a particular resource, node identification module can conclude that the wireless terminal currently corresponding to that resource is active.

A peer to peer wireless terminal may be transmitting peer discovery information at a low rate or at a high rate using air link resources, e.g., segments associated with its currently held identifier. While in low rate, the peer to peer wireless terminal transmits on its low rate peer discovery interval resources during its low rate discovery intervals, but refrains from transmitting on its additional discovery interval resources during its additional discovery intervals. Discovery information rate determination module 1334 determines whether a wireless terminal which is actively transmitting discovery information is in a high rate transmit mode with regard to discovery information or a low rate transmit mode with regard to discovery information. Discovery information modes of wireless terminals transmitting discovery information 1360 is an output of discovery information rate determination module 1334.

Lack of detection of received recovered discovery information on additional discovery intervals air link resources corresponding to a device identifier can be used by discovery information rate determination module 1334 to determine that the wireless terminal corresponding to the device identifier is in low rate mode. The detection of received recovered discovery information on additional discovery intervals air link resources corresponding to a device identifier can be used by discovery information rate determination module 1334 to determine that the wireless terminal corresponding to the device identifier is either in high rate mode or is already being assisted by another node. In some embodiments, the communications node does not distinguish between a condition in which a peer to peer wireless terminal is in high rate discovery information transmit mode or the peer to peer wireless terminal is in low rate discovery information transmit mode but is already being assisted by another node. In some other embodiments, the communications node 1300 attempts to distinguish between the two scenarios, e.g., by comparing received signals corresponding to the same device identifier but received during a low rate peer discovery interval and an additional discovery interval, e.g., in terms of received power, received SNR and/or received SINR. In some embodiments, a flag is used to distinguish between whether the discovery portion is sourced from an original node or a node acting as an assist node.

Assist decision module 1336 determines whether or not communications device 1300 is to assist in the communication of discovery information for a wireless terminal corresponding to a device identifier which has been determined to be transmitting discovery information in low rate discovery transmit mode. Information 1360 is an input to assist decision module 1336 while information identifying wireless terminals being assisted 1362 is an output of assist decision module 1336.

Assist signal generation module 1338 generates an assist signal, e.g., a signal including a recovered peer discovery portion communicated during a low rate discovery interval, to be communicated during an additional discovery interval corresponding to the same device identifier, in accordance with the pattern information of the stored timing structure, for a wireless terminal which communications device 1300 has decided to assist. Thus for a wireless terminal, which communications device 1300 has decided to assist, the communications device 1300 generates assist signals and transmits those assist signals using the discovery interval segments of the additional discovery intervals corresponding to the device identifier.

The stored timing/frequency structure information 1339 includes a plurality of sets of information identifying peer discovery interval resources corresponding to different identifiers which may be temporarily associated with a wireless terminal (information identifying peer discovery interval resources for device identifier ID 1 1340, . . . , information identifying peer discovery interval resource for device identifier ID N 1346), an mapping pattern information 1351. Information identifying peer discovery interval resources for device identifier ID 1 1340 includes information identifying low rate peer discovery interval resources 1342 and information identifying additional discovery interval resources 1344. Similarly, information identifying peer discovery interval resources for device identifier ID N 1346 includes information identifying low rate peer discovery interval resources 1348 and information identifying additional discovery interval resources 1350.

The stored timing structure information 1339 includes information indicating a recurring pattern of peer discovery reception intervals and peer discovery transmission intervals, e.g., for times in which the communications node 1300 is to assist another node, e.g., a peer to peer wireless terminal in low rate discovery transmit mode, in communicating peer discovery information. For example, assume that the communications device 1300 is assisting the wireless terminal which is currently holding the identifier 1, then information identifying low rate peer discovery interval resources 1342 indicates intervals and segments that communications node 1300 should consider peer discovery reception intervals and resources, while information indicating additional discovery interval resources 1344 indicates intervals and segments that communications node 1300 should consider peer discovery transmission intervals and segments. Alternatively, or in addition, consider that the communications device 1300 is assisting the wireless terminal which is currently holding the identifier N, then information identifying low rate peer discovery interval resources 1348 indicates intervals and segments that communications node 1300 should consider peer discovery reception intervals and segments while information indicating additional discovery interval resources 1350 indicates intervals and segments that communications node 1300 should consider peer discovery transmission intervals and segments.

Mapping pattern information 1351 includes information identifying portions of information to be associated with particular discovery information resources in the recurring timing and frequency structure. For example, information 1351 defines mapping of discovery information portions to an indexed set of discovery resources in the recurring timing/frequency structure. Corresponding to a device identifier, mapping pattern information 1351 includes information identifying which prior transmitted portion which has been received on a low rate discovery resource is to retransmitted on a particular additional discovery resource. FIG. 9 and FIG. 10 illustrate examples of some information defined by mapping pattern information for two exemplary embodiments.

Figure 14:
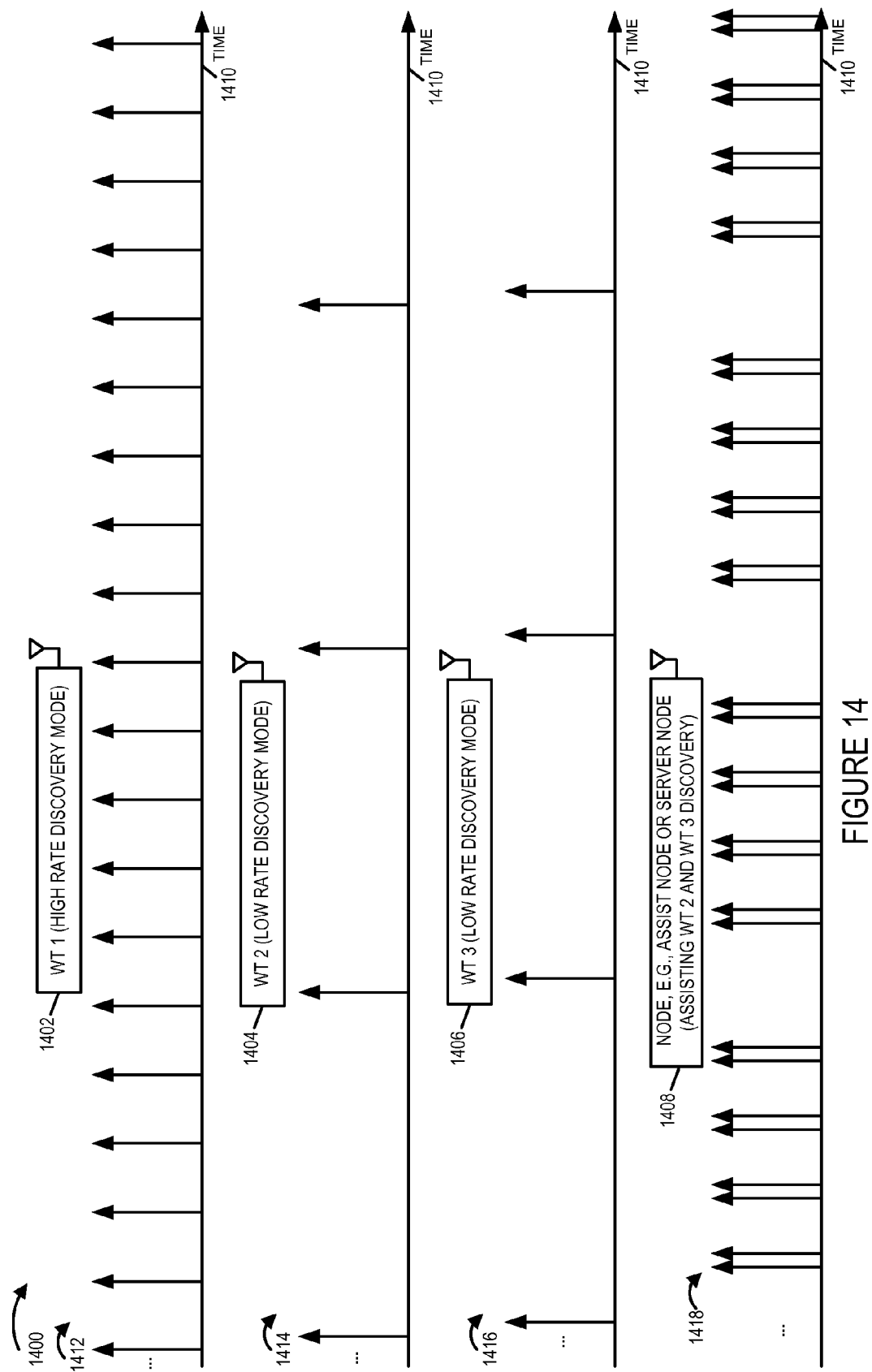
FIG. 14 is a drawing illustrating exemplary nodes in a peer to peer communications system and the transmission of discovery information.

FIG. 14 is a drawing 1400 illustrating exemplary nodes in a peer to peer communications system and the transmission of discovery information. The exemplary nodes include a first wireless terminal 1402, e.g., a peer to peer mobile node, which is operating in a high rate discovery mode and which is transmitting discovery information at a high rate, as indicated by discovery signals 1412 being transmitted along time axis 1410. The exemplary nodes also include a second wireless terminal 1404, e.g., a second peer to peer mobile node, which is operating in a low rate discovery mode and which is transmitting discovery information at a low rate, as indicated by discovery signals 1414 being transmitted along time axis 1410. Similarly, third wireless terminal 1406, e.g., a third peer to peer mobile node, which is operating in a low rate discovery mode is transmitting discovery information at a low rate, as indicated by discovery signals 1416 being transmitted along time axis 1410. Exemplary node 1408, e.g., an assist node or server node such as a base station, is also included. Node 1408, has recognized that WT 2 1404 and WT 3 1406 are transmitting discovery information at a low rate, has made a decision to assist both nodes (1404, 1406) and is transmitting discovery information using the air link resources which wireless terminal 2 1404 and wireless terminal 1406 would have used if the nodes had been in high rate discovery mode instead of low rate discovery mode. Discovery information signals 1418 transmitted by node 1408 includes copies of previously transmitted discovery information signals transmitted by WT 2 1404 and 1406, e.g., in accordance with a predetermined transmission pattern sequence such as one represented by FIG. 9 or FIG. 10.

Figure 15:
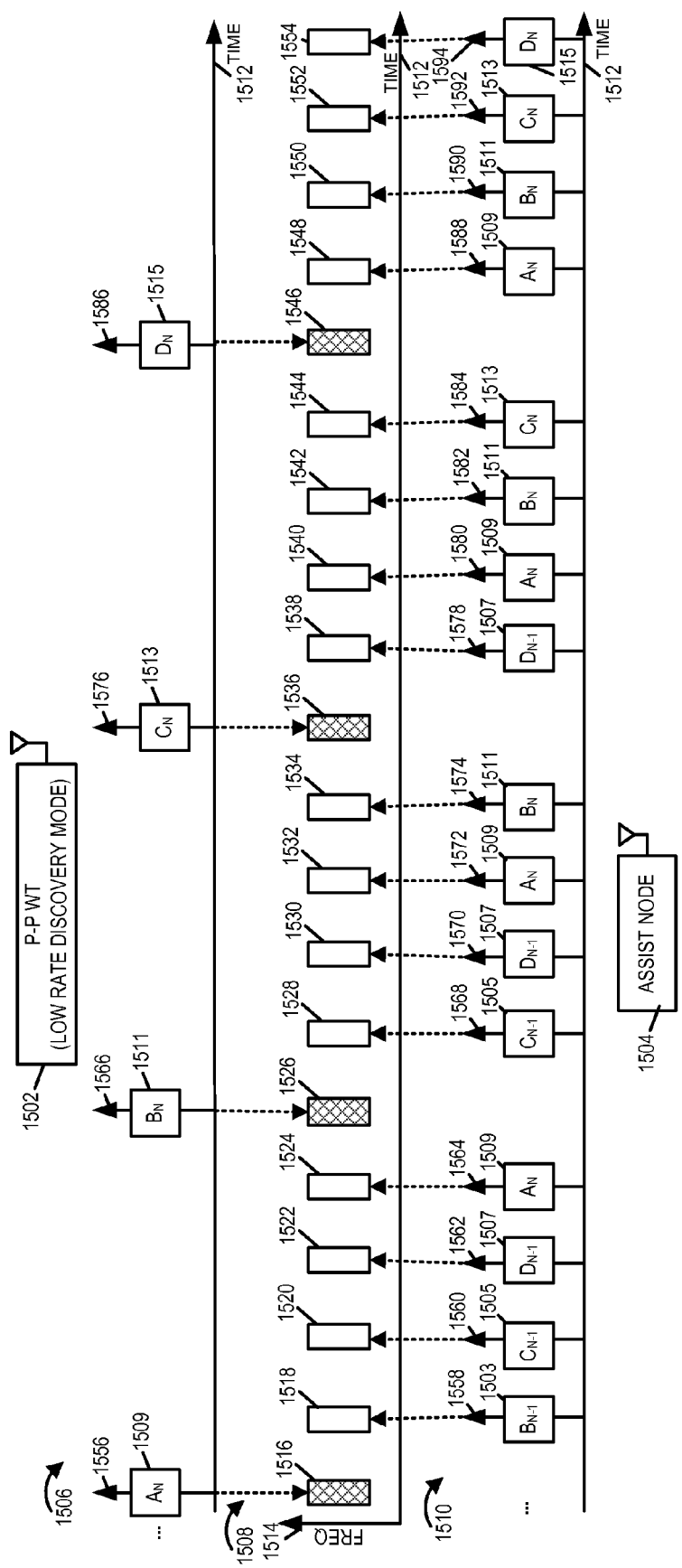
FIG. 15 is a drawing illustrating an exemplary peer to peer wireless terminal, an exemplary assist node, air link resources associated with communicating discovery information portions, and exemplary signaling in accordance with one exemplary embodiment.

FIG. 15 is a drawing illustrating an exemplary peer to peer wireless terminal 1502, an exemplary assist node 1504, air link resources associated with communicating discovery information portions, and exemplary signaling in accordance with one exemplary embodiment. In this example, peer to peer wireless terminal 1502 is currently in a low rate discovery transmit mode, and assist node 1504 is currently assisting wireless terminal 1502 in the communication of discovery information portions. Assume that wireless terminal 1502 has generated a first set of discovery information portions which is the set of {portion $A_{N-1}$ 1501, portion $B_{N-1}$ 1503, portion $C_{N-1}$ 1505, portion $D_{N-1}$ 1507} and a second set of discovery information portions which is the set of {portion $A_N$ 1509, portion $B_N$ 1511, portion $C_N$ 1513, portion $D_N$ 1515}. Assume that wireless terminal 1502 has previously transmitted discovery information portions $A_{N-1}$ 1501, $B_{N-1}$ 1503, $C_{N-1}$ 1505, and $D_{N-1}$ 1507 using prior low rate discovery interval air link resources, e.g., segments, and that assist node has received such transmissions and stored the received portions in its memory to be available for re-transmission.

Drawing 1508 plots frequency on the vertical axis 1514 vs time on the horizontal axis 1512 and illustrates discovery interval air link resources (1516, 1518, 1520, 1522, 1524, 1526, 1528, 1530, 1532, 1534, 1536, 1538, 1540, 1542, 1544, 1546, 1548, 1550, 1552, 1554), e.g., segments or transmission units, associated with the device identifier currently held by wireless terminal 1502. Air link resources (1516, 1526, 1536, 1546) indicated by crosshatch shading are low rate discovery air link resources, while air link resources (1518, 1520, 1522, 1524, 1528, 1530, 1532, 1534, 1538, 1540, 1542, 1544, 1548, 1550, 1552, 1554) indicated by no shading are additional discovery air link resources.

Drawing 1506 illustrates signaling transmitted by peer to peer wireless terminal 1502, while drawing 1510 illustrates signaling transmitted by assist node 1504. Wireless terminal 1502 transmits signal 1556 conveying discovery information portion $A_N$ 1509 using low rate discovery air link resource 1516. This transmitted signal 1556 is received and recovered by assist node 1504 which stores discovery information portion $A_N$ 1509. Assist node 1504 transmits signal 1558 conveying discovery information portion $B_{N-1}$ 1503 using additional discovery interval air link resource 1518. Assist node 1504 transmits signal 1560 conveying discovery information portion $C_{N-1}$ 1505 using additional discovery interval air link resource 1520. Assist node 1504 transmits signal 1562 conveying discovery information portion $D_{N-1}$ 1507 using additional discovery interval air link resource 1522. Assist node 1504 transmits signal 1564 conveying discovery information portion $A_N$ 1509 using additional discovery interval air link resource 1524.

Wireless terminal 1502 transmits signal 1566 conveying discovery information portion $B_N$ 1511 using low rate discovery air link resource 1526. This transmitted signal 1566 is received and recovered by assist node 1504 which stores discovery information portion $B_N$ 1511. Assist node 1504 transmits signal 1568 conveying discovery information portion $C_{N-1}$ 1505 using additional discovery interval air link resource 1528. Assist node 1504 transmits signal 1570 conveying discovery information portion $D_{N-1}$ 1507 using additional discovery interval air link resource 1530. Assist node 1504 transmits signal 1572 conveying discovery information portion $A_N$ 1509 using additional discovery interval air link resource 1532. Assist node 1504 transmits signal 1574 conveying discovery information portion $B_N$ 1511 using additional discovery interval air link resource 1534.

Wireless terminal 1502 transmits signal 1576 conveying discovery information portion $C_N$ 1513 using low rate discovery air link resource 1536. This transmitted signal 1576 is received and recovered by assist node 1504 which stores discovery information portion $C_N$ 1513. Assist node 1504 transmits signal 1578 conveying discovery information portion $D_{N-1}$ 1507 using additional discovery interval air link resource 1538. Assist node 1504 transmits signal 1580 conveying discovery information portion $A_N$ 1509 using additional discovery interval air link resource 1540. Assist node 1504 transmits signal 1582 conveying discovery information portion $B_N$ 1511 using additional discovery interval air link resource 1542. Assist node 1504 transmits signal 1584 conveying discovery information portion $C_N$ 1513 using additional discovery interval air link resource 1544.

Wireless terminal 1502 transmits signal 1586 conveying discovery information portion $D_N$ 1515 using low rate discovery air link resource 1546. This transmitted signal 1586 is received and recovered by assist node 1504 which stores discovery information portion $D_N$ 1515. Assist node 1504 transmits signal 1588 conveying discovery information portion $A_N$ 1509 using additional discovery interval air link resource 1548. Assist node 1504 transmits signal 1590 conveying discovery information portion $B_N$ 1511 using additional discovery interval air link resource 1550. Assist node 1504 transmits signal 1592 conveying discovery information portion $C_N$ 1513 using additional discovery interval air link resource 1552. Assist node 1504 transmits signal 1594 conveying discovery information portion $D_N$ 1515 using additional discovery interval air link resource 1554.

Exemplary wireless terminal 1502 is, e.g., one of the peer to peer wireless terminals (102, 104, 106, 108, 110) of FIG. 1. Exemplary assist node 1504 is, e.g., one of nodes (112, 114) of FIG. 1. The combination of the discovery signaling from peer to peer wireless terminal 1502 and assist node 1504, appears to another peer to peer wireless terminal in the vicinity of nodes (1502, 1504), as if peer to peer wireless terminal 1502 is transmitting in a high rate discovery transmit mode. This facilitates rapid recovery of discovery information originally sourced from wireless terminal 1502 without wireless terminal 1502 having to perform each of the transmissions. Thus peer to peer wireless terminal 1502, which may be a mobile device, is allowed to conserve battery power, yet its discovery information is being made available to other devices at a high rate because of the assistance provided by assist node 1504.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, receiving a signal, determining a best connection for a carrier of interest, calculating a service level indicating metric for a current attachment point, calculating a service level indicating metric for an alternative attachment point, making a hand-off decision. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first node to assist in communicating peer discovery information corresponding to a second node, the method comprising:
receiving over airlink portions of one or more sets of peer discovery information from the second node, said portions being received at a first rate; and
transmitting over the airlink at a second rate which is faster than said first rate, received portions of peer discovery information corresponding to said second node.

2. The method of claim 1, wherein transmitting over the airlink at a second rate includes transmitting individual received portions of a set of peer discovery information multiple times.

3. The method of claim 2, wherein transmitting over the airlink at a second rate includes transmitting a full set of peer discovery information for each received portion of a set of peer discovery information.

4. The method of claim 3, wherein a set of peer discovery information includes N portions, each of said N portions being transmitted N times.

5. The method of claim 3, wherein a previously received set of peer discovery information is transmitted between two consecutively received portions of peer discovery information.

6. The method of claim 3 further comprising;
storing timing structure information indicating a recurring pattern of peer discovery reception intervals and peer discovery transmission intervals.

7. The method of claim 6, further comprising:
controlling the first node to switch between receiving and transmitting based on the stored timing structure information.

8. The method of claim 1, further comprising:
receiving over the airlink portions of one or more sets of peer discovery information from a third node, said portions being received at the first rate; and
transmitting over the airlink at the second rate which is faster than said first rate, received portions of peer discovery information corresponding to said third node.

9. A first node to assist in communicating peer discovery information corresponding to a second node, the first node comprising:
a wireless receiver module for receiving over an airlink portions of one or more sets of peer discovery information from the second node, said portions being received at a first rate;
a peer discovery portion recovery module for recovering said received portions;
a wireless transmitter module for transmitting over the airlink at a second rate which is faster than said first rate, received recovered portions of peer discovery information corresponding to said second node.

10. The first node of claim 9, further comprising:
a storage module for storing said recovered received portions.

11. The first node of claim 9, further comprising:
an assist control module for controlling said wireless transmitter module to transmit said received recovered portions of peer discovery information corresponding to the second node at the second rate.

12. The first node of claim 9, wherein transmitting over the airlink at a second rate includes transmitting individual received portions of a set of peer discovery information multiple times.

13. The first node of claim 12, wherein transmitting over the airlink at a second rate includes transmitting a full set of peer discovery information for each received portion of a set of peer discovery information.

14. The first node of claim 13, wherein a set of peer discovery information includes N portions, each of said N portions being transmitted N times.

15. The first node of claim 13, wherein a previously received set of peer discovery information is transmitted between two consecutively received portions of peer discovery information.

16. The first node of claim 13 further comprising;
memory including stored timing structure information indicating a recurring pattern of peer discovery reception intervals and peer discovery transmission intervals.

17. The first node of claim 16, further comprising:
a mode control module for controlling the first node to switch between receiving and transmitting based on the stored timing structure information.

18. The first node of claim 9, wherein said wireless receiver module is also for receiving over the airlink portions of one or more sets of peer discovery information from a third node, said portions being received at said first rate;
wherein said peer discovery portion recovery module is also for recovering said received portions from said third node; and
wherein said wireless transmitter module is also for transmitting over the airlink at said second rate which is faster than said first rate, received recovered portions of peer discovery information corresponding to said third node.

19. The first node of claim 18, further comprising:
an assist decision module for deciding whether or not to provide discovery mode assistance to one or more devices from which low rate discovery signals have been detected.

20. A first node to assist in communicating peer discovery information corresponding to a second node, the first node comprising:
wireless receiver means for receiving over an airlink portions of one or more sets of peer discovery information from the second node, said portions being received at a first rate;
peer discovery portion recovery means for recovering said received portions; and
wireless transmitter means for transmitting over the airlink at a second rate which is faster than said first rate, received recovered portions of peer discovery information corresponding to said second node.

21. The wireless communications device of claim 20, further comprising:
storage means for storing said recovered received portions.

22. The wireless communications device of claim 20, further comprising:
assist control means for controlling said wireless transmitter means to transmit said received recovered portion of peer discovery information corresponding to the second node at the second rate.

23. The first node of claim 20, wherein transmitting over the airlink at a second rate includes transmitting individual received portions of a set of peer discovery information multiple times.

24. The first node of claim 23, wherein transmitting over the airlink at a second rate includes transmitting a full set of peer discovery information for each received portion of a set of peer discovery information.

25. The first node of claim 24, wherein a set of peer discovery information includes N portions, each of said N portions being transmitted N times.

26. The first node of claim 24, wherein a previously received set of peer discovery information is transmitted between two consecutively received portions of peer discovery information.

27. The first node of claim 24 further comprising;
memory means including stored timing structure information indicating a recurring pattern of peer discovery reception intervals and peer discovery transmission intervals.

28. The first node of claim 27, further comprising:
mode control means for controlling the first node to switch between receiving and transmitting based on the stored timing structure information.

29. A computer program product for use in a first node, the computer program product comprising:
a non-transitory computer-readable medium comprising:
code for causing a computer to receive over an airlink portions of one or more sets of peer discovery information from a second node, said portions being received at a first rate; and
code for causing a computer to transmit over the airlink at a second rate which is faster than said first rate, received portions of peer discovery information corresponding to said first node.

30. The computer program product of claim 29, wherein said code for causing a computer to transmit over the airlink at a second rate includes code for causing a computer to transmit individual received portions of a set of peer discovery information multiple times.

31. The computer program product of claim 29, wherein said code for causing a computer to transmit over the airlink at a second rate includes code for causing a computer to transmit a full set of peer discovery information for each received portion of a set of peer discovery information.

32. An apparatus for use in a fist node, the apparatus comprising:
a processor configured to:
receive over an airlink portions of one or more sets of peer discovery information from a second node, said portions being received at a first rate; and
transmit over the airlink at a second rate which is faster than said first rate, received portions of peer discovery information corresponding to said first node.

33. The apparatus of claim 32, wherein being configured to transmit over the airlink at a second rate includes being configured to transmit individual received portions of a set of peer discovery information multiple times.

34. The apparatus of claim 33, wherein being configured to transmit over the airlink at a second rate includes being configured to transmit a full set of peer discovery information for each received portion of a set of peer discovery information.

* * * * *